(12) United States Patent
Miyamoto et al.

(10) Patent No.: US 12,147,218 B2
(45) Date of Patent: Nov. 19, 2024

(54) INFORMATION COLLECTION AND DISPLAY SYSTEM, INFORMATION COLLECTION METHOD, AND INFORMATION DISPLAY METHOD

(71) Applicant: Hitachi, Ltd., Tokyo (JP)

(72) Inventors: Hiroki Miyamoto, Tokyo (JP); Yuncheng Zhu, Tokyo (JP); Noboru Fujita, Tokyo (JP); Masahiro Kimura, Tokyo (JP); Yuta Okubo, Tokyo (JP); Daisuke Okabe, Tokyo (JP)

(73) Assignee: HITACHI, LTD., Tokyo (JP)

( * ) Notice: Subject to any disclaimer, the term of this patent is extended or adjusted under 35 U.S.C. 154(b) by 967 days.

(21) Appl. No.: 16/139,383

(22) Filed: Sep. 24, 2018

(65) Prior Publication Data
US 2019/0271969 A1    Sep. 5, 2019

(30) Foreign Application Priority Data

Mar. 2, 2018   (JP) ................................ 2018-037446

(51) Int. Cl.
*G06Q 10/06* (2023.01)
*G05B 13/04* (2006.01)
(Continued)

(52) U.S. Cl.
CPC .......... *G05B 19/4183* (2013.01); *G05B 13/04* (2013.01); *G05B 19/048* (2013.01);
(Continued)

(58) Field of Classification Search
CPC ................ G05B 19/4183; G05B 13/04; G05B 19/41865; G05B 19/048;
(Continued)

(56) References Cited

U.S. PATENT DOCUMENTS 6,898,475 B1 *   5/2005   Ruml ..................... G06Q 10/06
                                                  700/99
2006/0031250 A1 *  2/2006  Henigman ............ G06F 16/284
(Continued)

FOREIGN PATENT DOCUMENTS

CN         103116813 A   *   5/2013
JP         2010-073180       4/2010
(Continued)

OTHER PUBLICATIONS

Mikiharu Aoki, "The automobile factory", Nov. 8, 2012, with English translation.
(Continued)

*Primary Examiner* — Catherine T. Rastovski
*Assistant Examiner* — Yossef Korang-Beheshti
(74) *Attorney, Agent, or Firm* — MATTINGLY & MALUR, PC

(57) ABSTRACT

An information collection and display system is provided, in which a data generation device that generates site data and a transaction data accumulation unit that stores the site data are connected. The system includes an association data accumulation unit storing association data which defines an association of each of multiple pieces of information included in the site data; an association data search unit which searches for second information associated with first information included in the pieces of information, on the basis of the association data; and a user interface that displays a connection relation of the pieces of information associated by the association data. The association data search unit searches for the second information associated with the first information displayed on the user interface and displays the first information and the second information on the user interface with the connection relation of the pieces of information.

5 Claims, 23 Drawing Sheets

(51) Int. Cl.
　　　*G05B 19/048*　　(2006.01)
　　　*G05B 19/418*　　(2006.01)
　　　*G06F 17/00*　　(2019.01)
　　　*G06Q 10/0631*　　(2023.01)
(52) U.S. Cl.
　　　CPC ....... *G05B 19/41865* (2013.01); *G06F 17/00* (2013.01); *G06Q 10/06* (2013.01); *G06Q 10/06315* (2013.01); *G05B 2219/31391* (2013.01); *G05B 2219/31397* (2013.01)
(58) Field of Classification Search
　　　CPC .......... G05B 2219/31391; G05B 2219/31397; G06F 17/00; G06Q 10/06315; G06Q 10/06; Y02P 90/02
　　　See application file for complete search history.

(56) References Cited

U.S. PATENT DOCUMENTS

| 2009/0024239 | A1 | 1/2009 | Yoshioka et al. |
| 2012/0004952 | A1* | 1/2012 | Shimoi ............ G06Q 10/06398 |
| | | | 705/7.42 |
| 2012/0203740 | A1* | 8/2012 | Ben-Dyke ............. G06F 16/284 |
| | | | 707/E17.054 |
| 2015/0278721 | A1* | 10/2015 | Oku .................... G06F 16/2291 |
| | | | 705/7.11 |
| 2017/0153616 | A1 | 6/2017 | Sakakibara et al. |
| 2019/0258230 | A1 | 8/2019 | Chiba et al. |

FOREIGN PATENT DOCUMENTS

| JP | 2010-073181 | | 4/2010 |
| JP | 2013246773 | A * | 12/2013 |
| JP | 2014-182538 | | 9/2014 |
| JP | 2015-153196 | A | 8/2015 |
| JP | 2017-102548 | A | 6/2017 |
| WO | WO-2018/079185 | A1 | 5/2018 |

OTHER PUBLICATIONS

Search Report issued in corresponding European Patent Application No. 19160329.9 dated Jul. 16, 2019.

* cited by examiner

INFORMATION COLLECTION AND DISPLAY SYSTEM, INFORMATION COLLECTION METHOD, AND INFORMATION DISPLAY METHOD

INCORPORATION BY REFERENCE

This application claims priority based on Japanese patent application, No. 2018-037446 filed on Mar. 2, 2018, the entire contents of which are incorporated herein by reference.

BACKGROUND OF THE INVENTION

The present invention relates to an information collection and display system, an information collection method, and an information display method.

Conventionally, there are many tasks configuring a manufacturing process when finished products and the like are manufactured in factories or offices in a manufacturing industry. In each task configuring the manufacturing process, site data is generated and collected when the task is completed or a predetermined event is generated and the site data is analyzed to optimize work efficiency in each task. On the other hand, if departments managing the respective tasks are different, information sharing between the departments becomes difficult and an improvement on a problem associated with the departments (tasks) does not progress. As one of the reasons why the improvement on the problem associated with the departments (tasks) does not progress, it is considered that a system used for managing the task in each department is different and a management system is not standardized. In each department, optimization of work efficiency in the department progresses by analyzing the collected site data. For this reason, if overall optimization of a series of manufacturing processes is sought, efficiency of an own department may be lowered. As a result, a department evaluation may be lowered.

However, in the manufacturing industry, a production system proceeds from a mass production system to a small quantity multi-product production system and cooperation between the departments is indispensable to increase production efficiency of the whole manufacturing process. As a method for promoting the cooperation between the departments, it is considered that the cooperation between the departments is promoted by presenting site data managed by an own department and site data managed by other departments in association with each other, instead of presenting a problem using fact data (fact information) capable of analyzing the problem commonly in each department.

JP 2015-153196 A discloses an information collection system in which it is not necessary to configure a link between databases and various site data and supplementary information of each manufacturing process can be efficiently collected easily from the viewpoint of traceability.

In addition, JP 2017-102548 A discloses a production management device in which traceability data can be managed for each work without using an ID tag and the traceability data can be easily specified from a defective product.

SUMMARY

However, in the information collection system described in JP 2015-153196 A, it is necessary to store all associated data as supplementary information in a database and the database having an enormous storage capacity is required. For this reason, a facility cost or a maintenance cost increases. Furthermore, if a user does not understand a data structure of the data stored in the database, the user cannot acquire desired data.

In the production management device described in JP 2017-102548 A, a data generation device that generates the site data is limited to a specific device and it is difficult to associate all the site data collected or generated by a series of manufacturing processes. In addition, although an identifier is attached to the collected site data, only association between a finished product and parts corresponding to the finished product is known and how to associate and display the site data in a series of manufacturing processes is not presented. For this reason, it is difficult to effectively use the collected site data.

Accordingly, the present invention has been made in view of the above problems and an object of the present invention is to accumulate and manage necessary minimum information to associate task information and task association information included in site data as association data to decrease a capacity of a storage device that stores the association data and search for and display predetermined first information and second information associated with the first information using the association data to easily analyze site data at each site.

To solve the above problems, according to an aspect of the present invention, there is an information collection and display system in which a data generation device that generates site data and a storage device that stores the site data generated by the data generation device are connected.

The information collection and display system includes an association data accumulation unit that stores association data defining association of each of a plurality of pieces of information included in the site data; an association data search unit that searches for second information associated with first information included in the plurality of pieces of information, on the basis of the association data stored in the association data accumulation unit; and a user interface unit that displays a connection relation of the plurality of pieces of information associated by the association data. The association data search unit searches for the second information associated with the first information on the basis of the association data, according to selection of the first information in the connection relation of the plurality of pieces of information displayed on the user interface unit, and displays the first information and the second information on the user interface unit with the connection relation of the plurality of pieces of information.

According to the aspect, necessary minimum information to associate the plurality of pieces of information included in the site data is accumulated and managed as the association data, so that a capacity of the storage device that stores the association data can be decreased, and the predetermined first information and the second information associated with the first information are searched and displayed using the association data, so that site data at each site can be easily analyzed.

According to the present invention, site data can be easily analyzed.

The details of one or more implementations of the subject matter described in the specification are set forth in the accompanying drawings and the description below. Other features, aspects, and advantages of the subject matter will become apparent from the description, the drawings, and the claims.

DETAILED DESCRIPTION OF THE EMBODIMENTS

Hereinafter, an information collection and display system 1 according to an embodiment of the present invention will be described using the drawings. In this embodiment, the case where the information collection and display system 1 is applied to a system for collecting and displaying site data generated by each manufacturing process in a manufacturing factory is described as an example.

[Entire Configuration]

Figure 1:
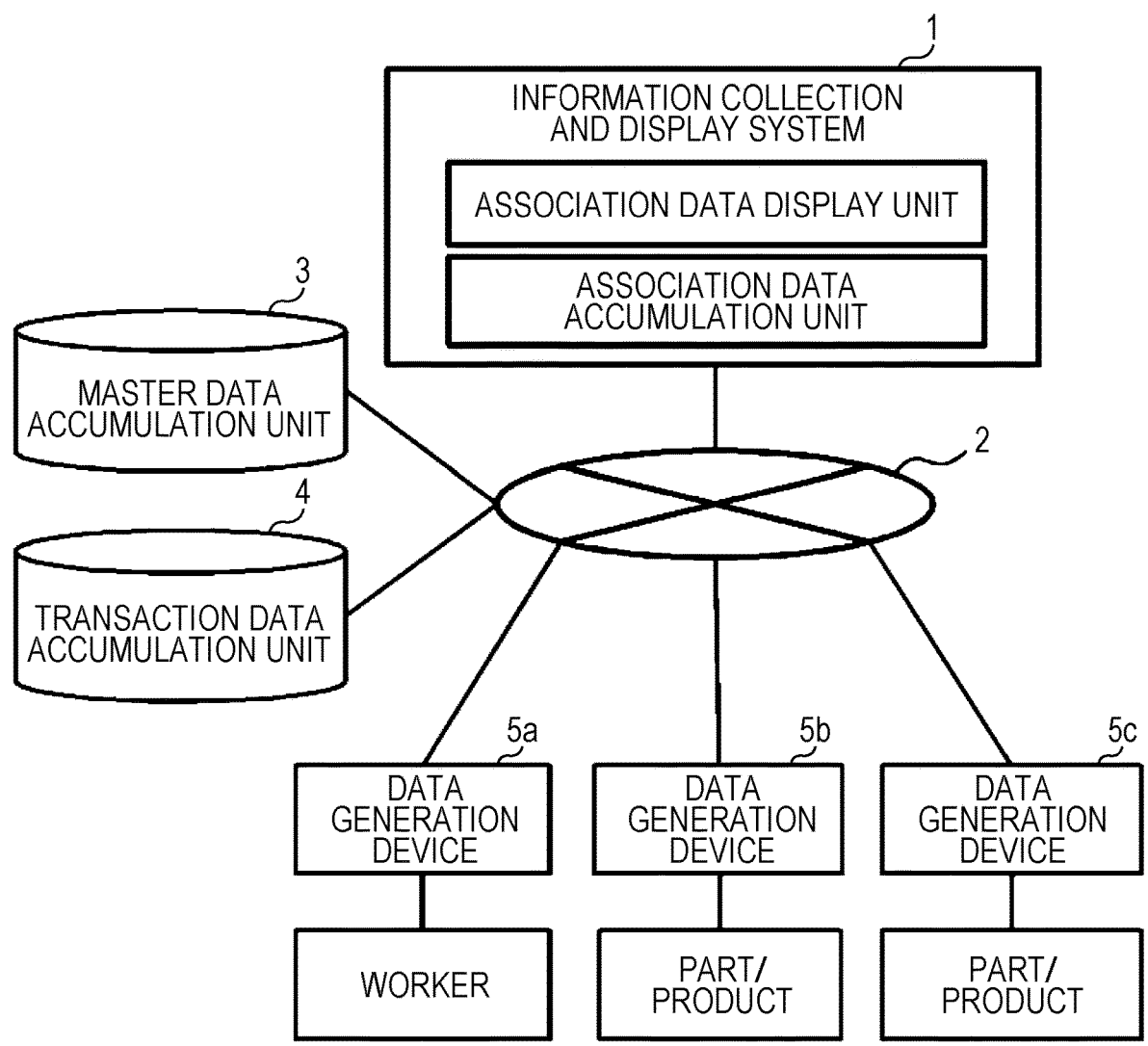
FIG. 1 is a diagram illustrating a connection relation between an information collection and display system according to an embodiment and a data generation device and each accumulation unit that accumulates actual data.

FIG. 1 is a diagram illustrating a connection relation between the information collection and display system 1 and a data generation device 5 and accumulation units 3 and 4 accumulating actual data.

As shown in FIG. 1, the information collection and display system 1 is connected to a network 2. A plurality of data generation devices 5a, 5b, and 5c (hereafter, the data generation devices 5a, 5b, and 5c are simply referred to as the data generation device 5 unless otherwise distinguished) that collects or generates actual data, the master data accumulation unit 3, and the transaction data accumulation unit 4 that accumulates the actual data (hereinafter, referred to as site data 100) are connected to the network 2 and the data generation device 5, the master data accumulation unit 3, and the transaction data accumulation unit 4 are connected to the information collection and display system 1 via the network 2.

The data generation device 5 is, for example, a barcode reader that acquires a work log of a worker, a PC or a server (for example, the data generation device 5a) that collects the work log, a machine (for example, the data generation device 5b) that processes a part or assemble a finished product, a sensor (for example, the data generation device 5c) that collects inspection information of a radio frequency identifier (RFID) attached to the part or the finished product, or the like. The site data 100 (actual data) collected or generated by the data generation device 5 is transmitted to the information collection and display system 1, the master data accumulation unit 3, or the transaction data accumulation unit 4 via the network 2.

The master data accumulation unit 3 is, for example, a storage device such as a server and a memory and accumulates a model for defining what kind of information is accumulated in the transaction data accumulation unit 4 or the like. The model is also referred to as master data. That is, the master data (model) defined by the master data accumulation unit 3 is changed, so that it is possible to change what kind of site data 100 (type of information to be collected) is collected from the data generation device 5. The master data of the master data accumulation unit 3 can be set or changed by an external device (not shown in the drawings).

The transaction data accumulation unit 4 is, for example, a storage device such as a server and a memory and the site data 100 including the information defined by the master data of the master data accumulation unit 3 is accumulated in the transaction data accumulation unit 4. In the embodiment, the site data 100 (see FIG. 7) such as identification information, a generation date and time, and an actual measurement value is accumulated in the transaction data accumulation unit 4.

[Information Collection and Display System]

Next, main functions of the information collection and display system 1 will be described. The information collection and display system 1 includes a central processing unit (CPU) that performs whole control of the information collection and display system 1, a storage device (Read Only Memory: ROM) that stores each control program to control the information collection and display system 1, a primary storage device (Random Access Memory: RAM) that temporarily stores information processed by the CPU, and a hard disk drive (HDD) and the CPU executes each control program stored in the ROM, so that the following functions are realized.

Figure 2:
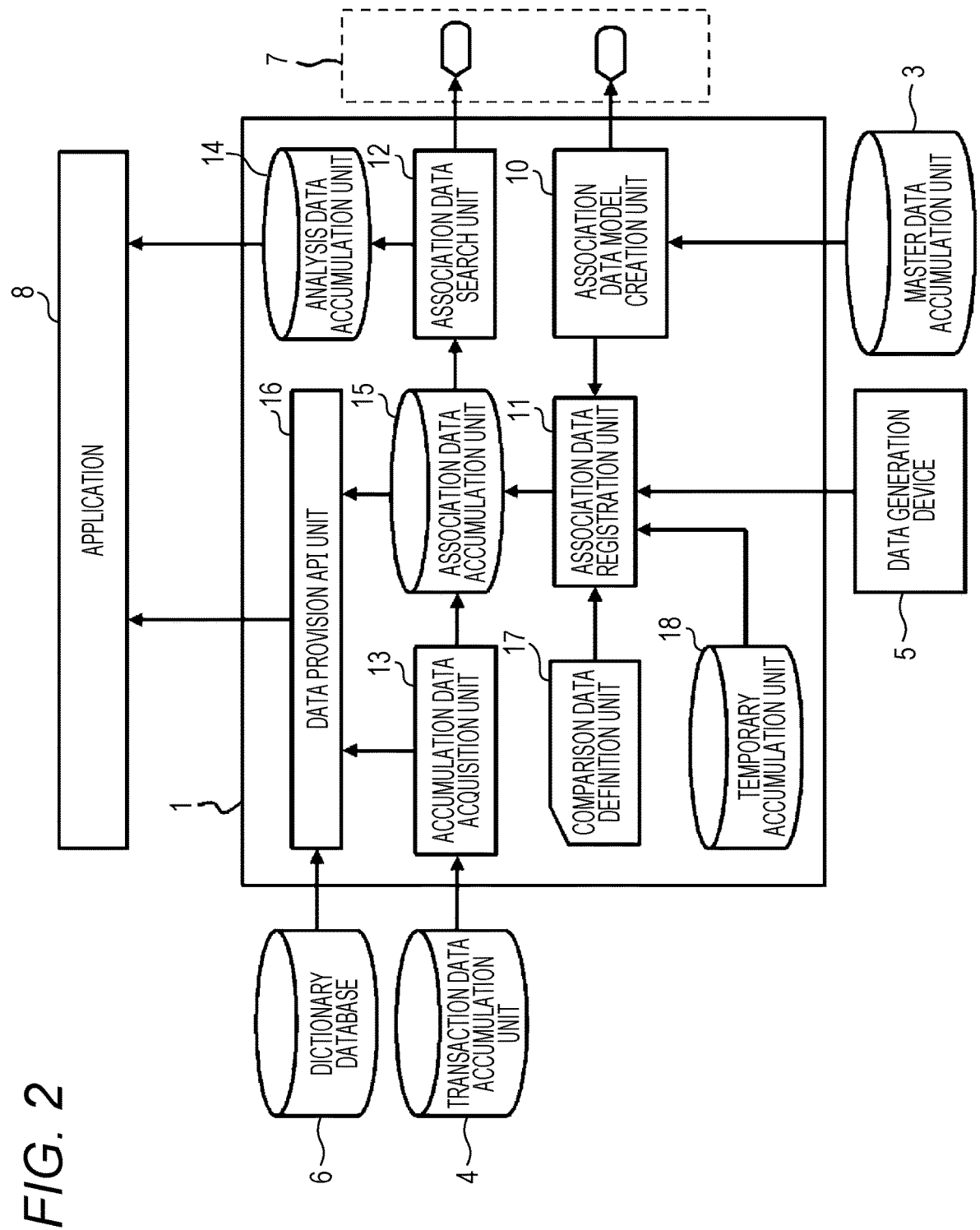
FIG. 2 is a block diagram illustrating functions of the information collection and display system.

FIG. 2 is a block diagram illustrating the functions of the information collection and display system.

As shown in FIG. 2, the information collection and display system 1 includes an association data model creation unit 10, an association data registration unit 11, an association data search unit 12, an accumulation data acquisition unit 13, an analysis data accumulation unit 14, an association data accumulation unit 15, a data provision API unit 16, a comparison data definition unit 17, and a temporary accumulation unit 18.

As described above, the information collection and display system 1 is connected to a dictionary database 6, the transaction data accumulation unit 4, the data generation device 5, and the master data accumulation unit 3 via the network 2. Further, the association data model creation unit 10 and the association data search unit 12 of the information collection and display system 1 are connected to a user interface 7 such as a display and can display information of a result processed by the information collection and display system 1 on the user interface 7 to provide the information to a user or the user can input predetermined information to the association data model creation unit 10 or the association data search unit 12 via the user interface 7. In the information collection and display system 1, the analysis data accumulation unit 14 or the data provision API unit 16 can provide the information of the result processed by the information collection and display system 1 to an application 8 outside the information collection and display system 1.

The association data model creation unit 10 reads master data corresponding to model data from the master data accumulation unit 3, on the basis of the model data input from the user interface 7, and creates definition information 300 (400) to be described later. The definition information 300 (400) created by the association data model creation unit 10 has a predetermined data structure and defines what kind of data structure the association data registration unit 11 acquires the site data 100 with, from the data generation device 5.

The association data registration unit 11 receives the site data 100 from the data generation device 5 and structures the site data 100 on the basis of the data structure defined by the definition information 300 (400) acquired from the association data model creation unit 10. In addition, the association data registration unit 11 determines whether the site data 100 acquired according to the definition information 300 (400) is task information, information of a worker, information of a machine, information of a work procedure, or information of a material (part), on the basis of identification information assigned to the site data 100. Hereinafter, initial letters M of the worker (Man), the machine (Machine), the work procedure (Method), and the material (Material) may be taken and these may be referred to as 4M information (or 4M nodes) or task association information.

Here, the comparison data definition unit 17 is connected to the association data registration unit 11. A relation between the 4M information determined by the association data registration unit 11 and the identification information assigned to the site data 100 is defined in the comparison data definition unit 17 and the association data registration unit 11 correlates the 4M information determined by the association data registration unit 11 with the actually acquired site data 100 (maps the identification information of the site data 100 to the 4M information), on the basis of the definition. The association data registration unit 11 transmits the 4M information after the site data 100 is correlated to the association data accumulation unit 15. Further, the temporary accumulation unit 18 is connected to the association data registration unit 11. The temporary accumulation unit 18 is a storage device such as a memory and information to constitute a connection relation (to generate a connection line) of each information (the task information and the 4M information) included in the site data 100 is registered in the temporary accumulation unit 18.

The accumulation data acquisition unit 13 acquires the site data 100 from the transaction data accumulation unit 4 or the master data accumulation unit 3, on the basis of association data 200 accumulated in the association data accumulation unit 15.

When the user selects 4M information (first information) of the predetermined task from the user interface 7, the association data search unit 12 searches for other 4M information (second information) of the task associated with the 4M information (first information) on the basis of identification information assigned to the 4M information (first information) and displays the searched 4M information (second information) on the user interface 7 by hatching, color coding, or the like to provide the 4M information to the user. In addition, the association data search unit 12 transmits a connection relation of the selected 4M information (first information) and the searched 4M information (second information) to the analysis data accumulation unit 14. An example of a method of searching the 4M information by the association data search unit 12 will be described later.

The analysis data accumulation unit 14 accumulates the connection relation of the selected 4M information (first information) and the searched 4M information (second information), transmitted from the association data search unit 12. The analysis data accumulation unit 14 transmits the accumulated connection relation of the 4M information to the application 8, so that other 4M information of the task associated with the selected 4M information can be used for various analysis methods.

The data provision API (Application Programming Interface) unit 16 transmits data associated by the association data 200 to the application 8. Here, the data provision API unit 16 is connected to the dictionary database 6. Here, item names of the 4M information used in each manufacturing process (task) may be different for each manufacturing process. Therefore, different words having the same meanings in the item names of the 4M information used in each manufacturing process are registered in association with each other in the dictionary database 6 and the data provision API unit 16 can surely acquire the data associated by the association data 200, including different words having the same meanings as well as the same words.

Here, an example of a data structure of the association data 200 managed by the information collection and display system 1 will be described.

Figure 3:
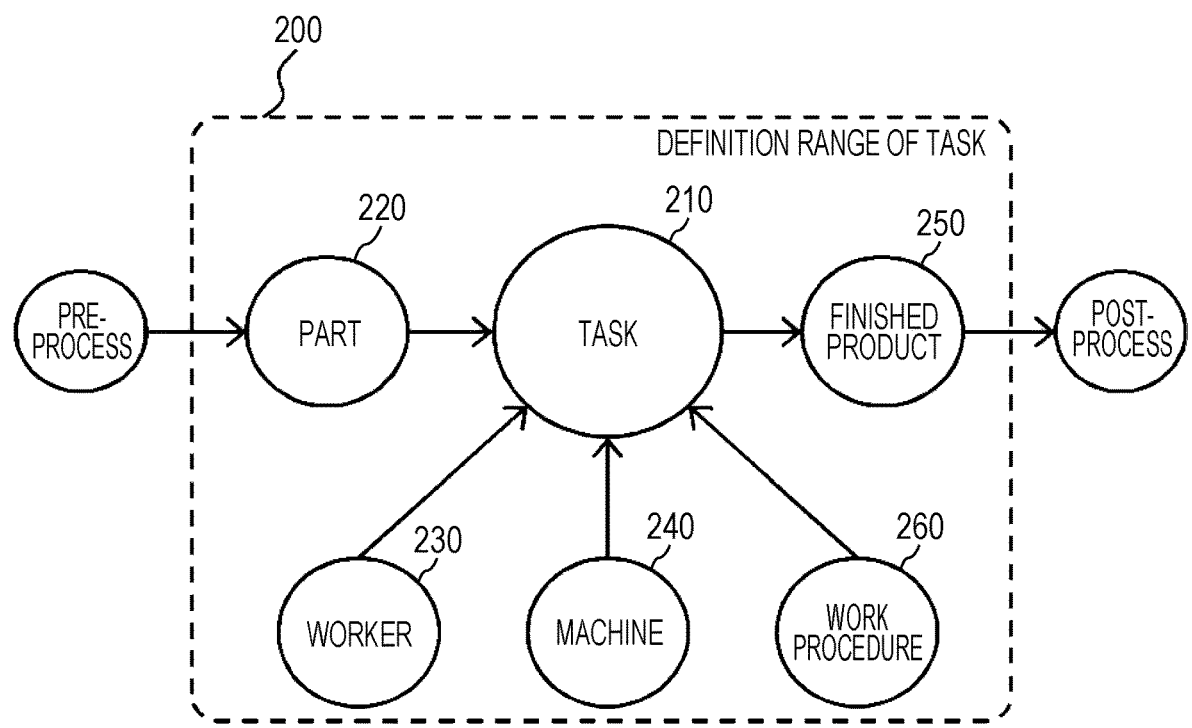
FIG. 3 is a diagram illustrating an example of a data structure of association data.

FIG. 3 is a diagram illustrating an example of a data structure of the association data 200. The association data 200 is data that is accumulated in the association data accumulation unit 15.

As shown in FIG. 3, the data structure of the association data 200 can represent what worker, machine, and part are associated in what way according to what work procedure, for the predetermined task (manufacturing process), by associating the site data 100 generated from various devices (data generation device 5) in each manufacturing process. In the embodiment, the association data 200 is configured by a task node 210 used as a center node, a part node 220 showing a material necessary for executing a task, a worker node 230 executing the task, a machine node 240 used to execute the task, a finished product node 250 generated as a result of executing the task using the part as the material, and a work procedure node 260 defining an execution procedure of the task. The finished product node 250 generated by executing the task node 210 becomes a material (part) to be used in a post-process and the part node 220 becoming the material of the task node 210 is a finished product generated in a pre-process. In other words, the meanings of the attributes of the part node 220 and the finished product node 250 are the same and the part node 220 and the finished product node 250 may be collectively referred to as a material node unless otherwise distinguished. As described above, the part node 220, the worker node 230, the machine node 240, and the work procedure node 260 are referred to as the 4M information or the 4M nodes.

In the information collection and display system 1, when a problem occurs in the finished product, it is possible to search the 4M information associated with the finished product by the association data 200 and it is possible to find a cause for a problem in a predetermined manufacturing process (task). In the embodiment, the case where identification information is assigned to each of the site data 100 collected or generated by the data generation device 5 in each manufacturing process is described as an example. In the information collection and display system 1, association between tasks can be managed by accumulating the association data 200 defining the association of machines, workers, and the like for the tasks, over a plurality of manufacturing processes (tasks).

Basic information of the association data 200 is timing (date and time) associated with the association between the identification information showing each information. The site data 100 (actual data) shown by each identification information of the association data 200 is accumulated in the externally managed transaction data accumulation unit 4 and a method of accessing the site data 100 accumulated in the transaction data accumulation unit 4 (a memory address for accessing the transaction data accumulation unit 4) is managed by the information collection and display system 1.

Figure 9:
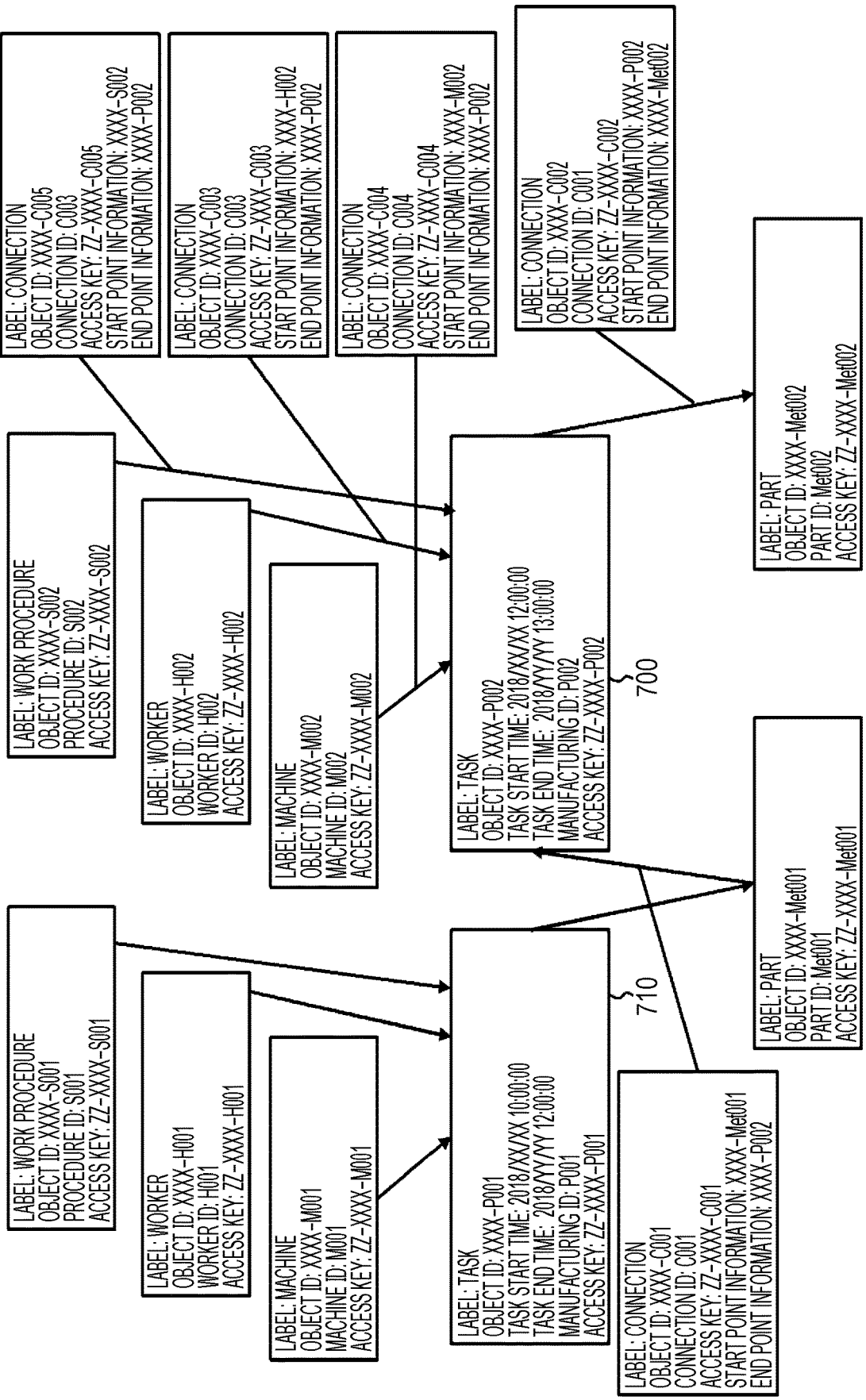
FIG. 9 is a diagram illustrating an example of association data in which each information of definition information is specifically associated by relation information.
Figure 10:
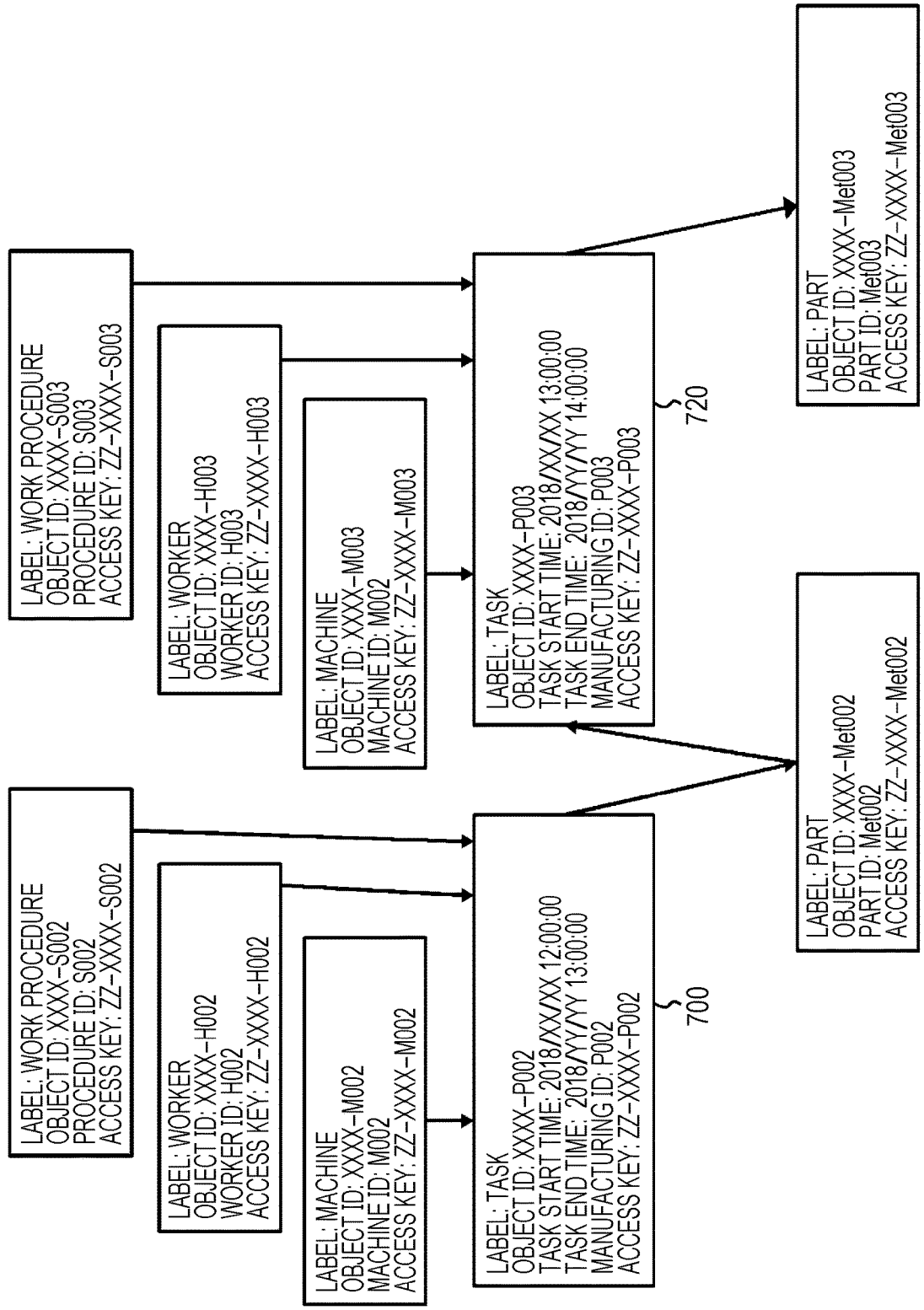
FIG. 10 is a diagram illustrating an example of association data in which each information of definition information is specifically associated by relation information.

The association data 200 is configured by the task node 210 and the 4M information. Each connection line to connect the nodes has an item necessary for executing the task as an input and the finished product generated by the actions as an output and this is represented by a directed graph. If manufacturing processes in which a plurality of tasks is linked are represented, these can be displayed as shown in FIGS. 9 and 10 to be described later.

Figure 4:
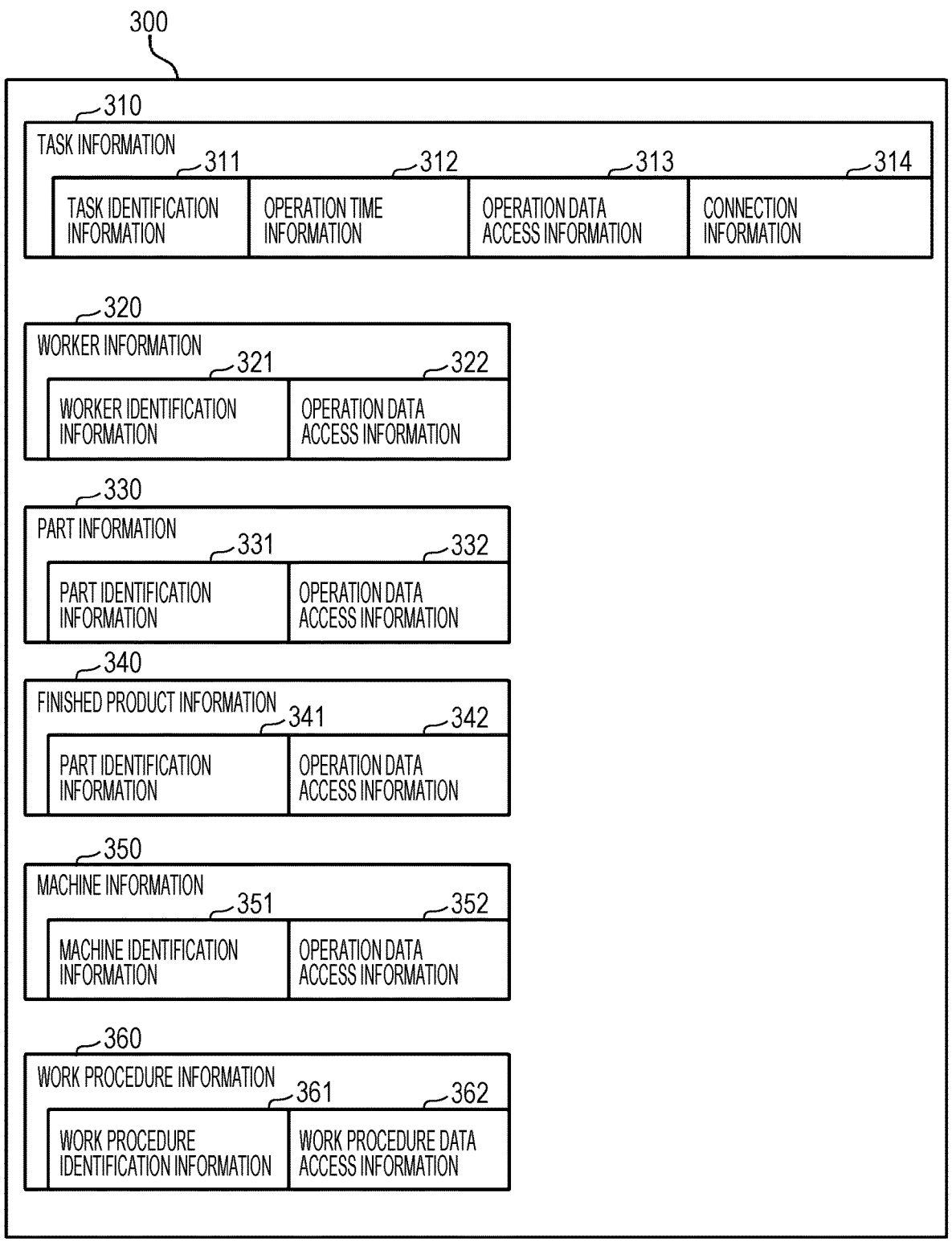
FIG. 4 is a diagram illustrating an example of a structure of definition information created by an association data model creation unit.

FIG. 4 is a diagram illustrating an example of a structure of the definition information 300 created by the association data model creation unit 10.

As shown in FIG. 4, the association data model creation unit 10 has the definition information 300 and the definition information 300 is configured by task information 310 to be definition information of the task node 210, worker information 320 to be definition information of the worker node 230, part information 330 to be definition information of the part node 230, finished product information 340 to be definition information of the finished product node 250, machine information 350 to be definition information of the machine node 240, and work procedure information 360 to be definition information of the work procedure node 260.

The task information 310 is configured to include task identification information 311, operation time information 312, operation data access information 313, and connection information 314.

The task identification information 311 is identification information for defining what kind of task in the task node 210. For example, in a manufacturing process of a vehicle, identification information that can uniquely specify a chassis pressing task or an assembling task is set. The task identification information 311 is identification information for defining association with other tasks and has a function of associating a plurality of tasks with each other. Information functioning as a key to acquire the site data 100 (actual data) from the transaction data accumulation unit 4 or the master data accumulation unit 3 on the basis of the operation data access information 313 is also included in the task identification information 311.

Information on a start time and an end time at the time of executing a predetermined task is set in the operation time information 312. For example, in the case of generating a finished product from parts in the predetermined task, an input time of the parts is set as the start time and a generation time of the finished product is set as the end time. The operation time information 312 is used as information for narrowing down from the viewpoint of time, in the case of referring to the operation information of the workers, the parts, the machines, and the like. By including the operation time information 312, even in time series data in which association is difficult in the viewpoints other than time series, the definition information 300 can be associated as the time series data when the task is executed and can be provided to the user.

The operation data access information 313 is used at the time of accessing the site data 100 accumulated in the transaction data accumulation unit 4 managed at the outside of the information collection and display system 1. Specifically, the operation data access information 313 includes a memory address of the site data 100 accumulated in the transaction data accumulation unit 4 or the master data accumulation unit 3. From-To of connection information for associating the task node 210 with the 4M node is described in the connection information 314. Details of the connection information 314 will be described later (see FIG. 6).

The worker information 320 is configured to include worker identification information 321 and operation data access information 322. In the worker identification information 321, an identifier for identifying a worker responsible for the task at the time of executing the task at the worker node 230 is set. The worker identification information 321 is used as a key for accessing a work record (log) of the worker accumulated in the transaction data accumulation unit 4 or the master data accumulation unit 3, on the basis of the operation data access information 322.

The part information 330 is configured to include part identification information 331 and operation data access information 332. The part identification information 331 is defined for identifying a material (part) used in the task and the operation data access information 332 includes memory addresses for accessing information such as materials and processing histories of parts accumulated in the transaction data accumulation unit 4 or the master data accumulation unit 3.

The finished product information 340 is configured to include finished product identification information 341 and operation data access information 342. The finished product identification information 341 is defined for identifying a finished product generated in the task and the operational data access information 342 includes memory addresses for accessing information such as processing histories of finished products accumulated in the transaction data accumulation unit 4 or the master data accumulation unit 3.

The machine information 350 is configured to include machine identification information 351 and operation data access information 352. In the machine identification information 351, information for identifying a machine to be used in the task is defined. For example, it is possible to identify whether the machine to be used in the task is a pressing machine, a coating machine, or an assembling machine, by the machine identification information 351. The operation data access information 352 can refer to the operation data by using the operation data access information 352 and the machine identification information 351, in the case where the user desires to refer to the operation data when the task is executed by the machine.

Finally, the work procedure information 360 is configured to include work procedure identification information 361 and work procedure data access information 362. In the work procedure identification information 361, identification information for specifying a work procedure manual in a target task is defined. The work procedure data access information 362 includes a memory address functioning as a key for accessing work procedure manual data accumulated in the transaction data accumulation unit 4 managed at the outside of the information collection and display system 1.

To shorten an access time to the transaction data accumulation unit 4 managed at the outside of the information collection and display system 1, information with a high utilization rate in the site data 100 may be held in the definition information.

Figure 5:
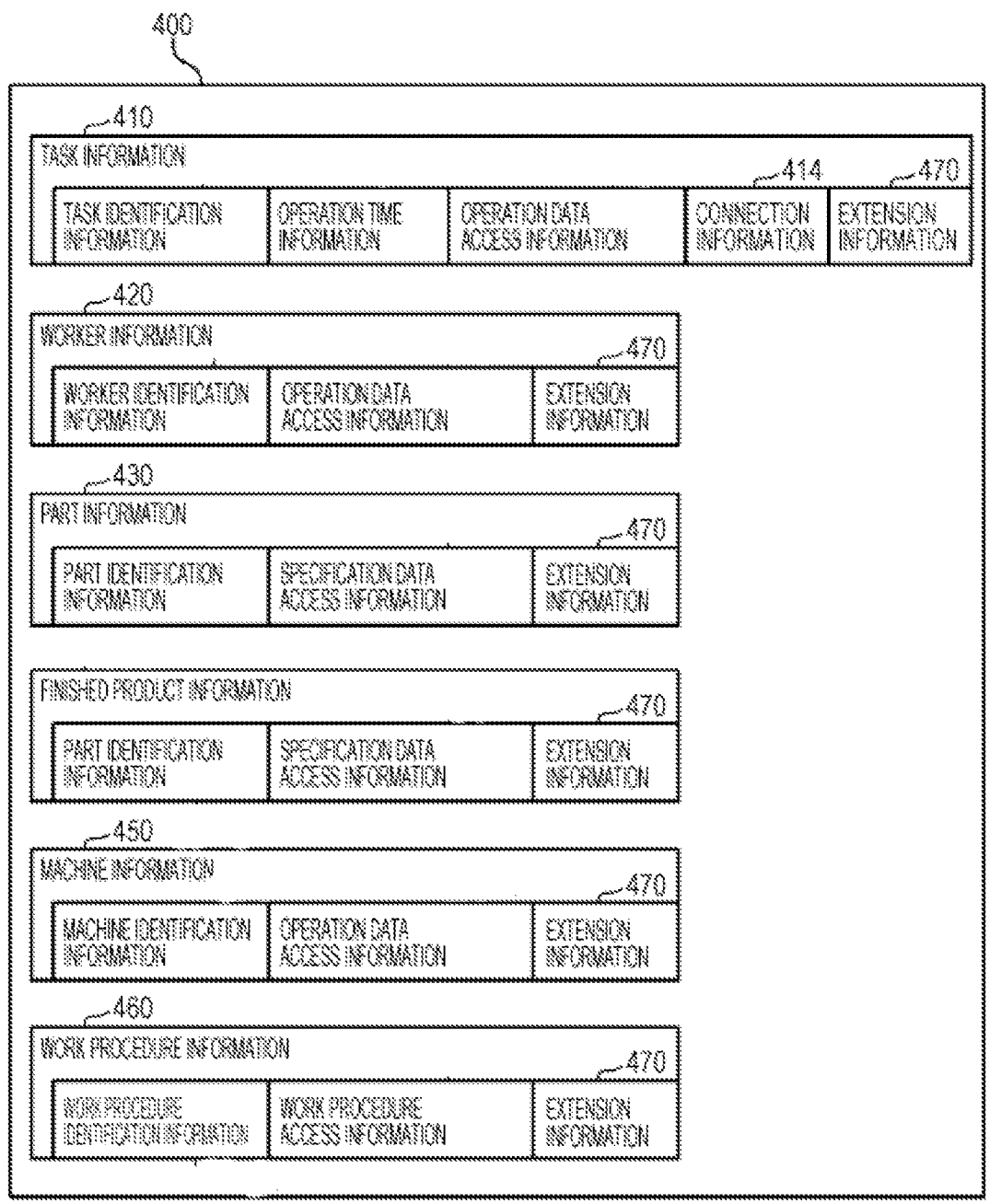
FIG. 5 is a diagram illustrating an example of a structure of definition information according to another embodiment.

FIG. 5 is a diagram illustrating an example of a structure of definition information 400 according to another embodiment of FIG. 4.

As shown in FIG. 5, a basic structure of the definition information 400 according to a second embodiment is the same as the basic structure described in the definition information 300 of FIG. 4, but extension information 470 is added to each information. The information collection and display system 1 manages the association data 200 showing the connection relation of the respective site data 100 collected or generated in each manufacturing process and acquires the actual data of the site data 100 from the transaction data accumulation unit 4 managed at the outside of the information collection and display system 1, so that it may take time to acquire the site data 100. Therefore, in the information collection and display system 1, when it is necessary to acquire the site data 100 more quickly, the extension information 470 to be a storage area for storing information with a high utilization rate selectively in advance is set in the definition information 400. In this way, the information with the high utilization rate in the site data 100 can be directly held in the definition information 400, so that the information with the high utilization rate can be quickly acquired. Further, information important for management of operation information of information such as tasks and parts may be stored in the extension information 470. In this way, an analysis for an operation of the flow of the manufacturing process (line) can be easily performed.

Next, an example of the connection information 314 configuring the task information 310 described in FIG. 4 will be described. The connection information 314 is information for defining a connection relation of the task node 210, the part node 220, the worker node 230, the machine node 240, the finished product node 250, and the work procedure node 260 in the association data 200. That is, data of the connection relation of the respective nodes connected on the basis of the connection information 314 is matched with the association data 200 described in FIG. 3 and is stored in the association data accumulation unit 15.

Figure 6:
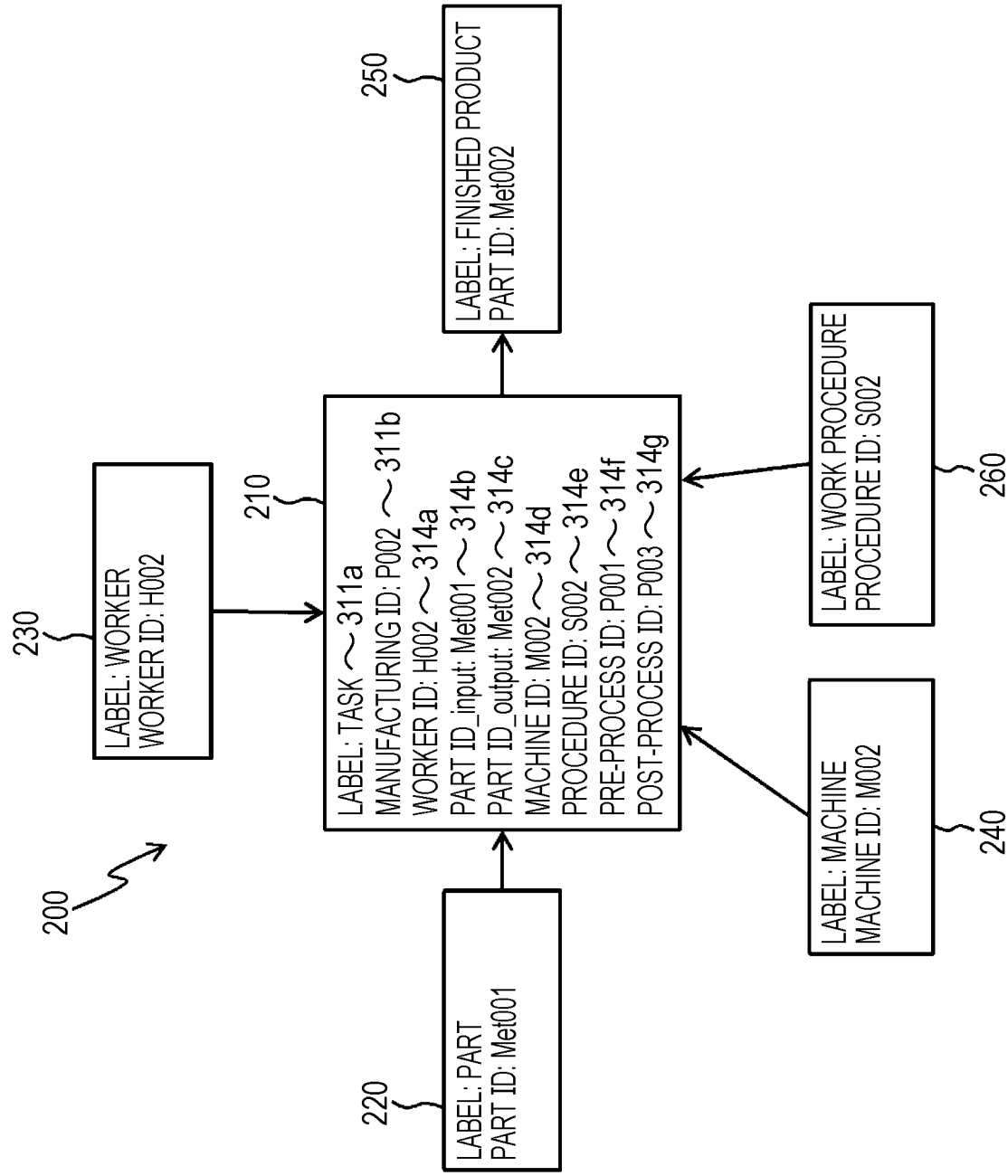
FIG. 6 is a diagram illustrating an example of each node connected on the basis of connection information.

FIG. 6 is a diagram illustrating an example of each node connected on the basis of the connection information 314. In FIG. 6, descriptions of information such as each identification information and each data access information (see FIGS. 4 and 5) described above are omitted and only necessary information is described in the description of the connection information 314.

As shown in FIG. 6, the connection information 314 is configured to include a label 311a and a manufacturing ID 311b included in the task identification information 311 and a worker ID 314a, a part ID input 314b, a part ID output 314c, a machine ID 314d, a procedure ID 314e, a pre-process ID 314f, and a post-process ID 314g included in the connection information 314.

In FIG. 6, all elements necessary for executing the task are defined by a direction from each 4M node (the part, the worker, the machine, and the work procedure) to the task node 210 and an output by execution of the work is defined by a direction from the task node 210 to the finished product node 250. A connection relation of each node is defined by describing an ID set to each node in the connection information 314. As a result, for example, a part ID (ID:Met001) set to the part node 220 and a part ID (ID:Met001) of the task node 210 are associated with each other and a connection line of a direction from the part node 220 to the task node 210 is created.

Similar to the above, even in each of the worker node 230, the machine node 240, and the work procedure node 260, an ID set to each node and a corresponding ID of the task node 210 are matched with each other and are associated with each other and a connection line of a direction from each node to the work node 210 is defined. For the finished product node 250, a finished product ID set to the finished product node 250 and a finished product ID of the task node 210 are associated with each other and a connection line of a direction from the task node 210 to the finished product node 250 is defined.

Next, an example of a configuration of the site data 100 will be described. The site data 100 collected or generated by the data generation device 5 is acquired by the association data registration unit 11 according to items and structures shown in FIG. 7 to be described below.

Figure 7:
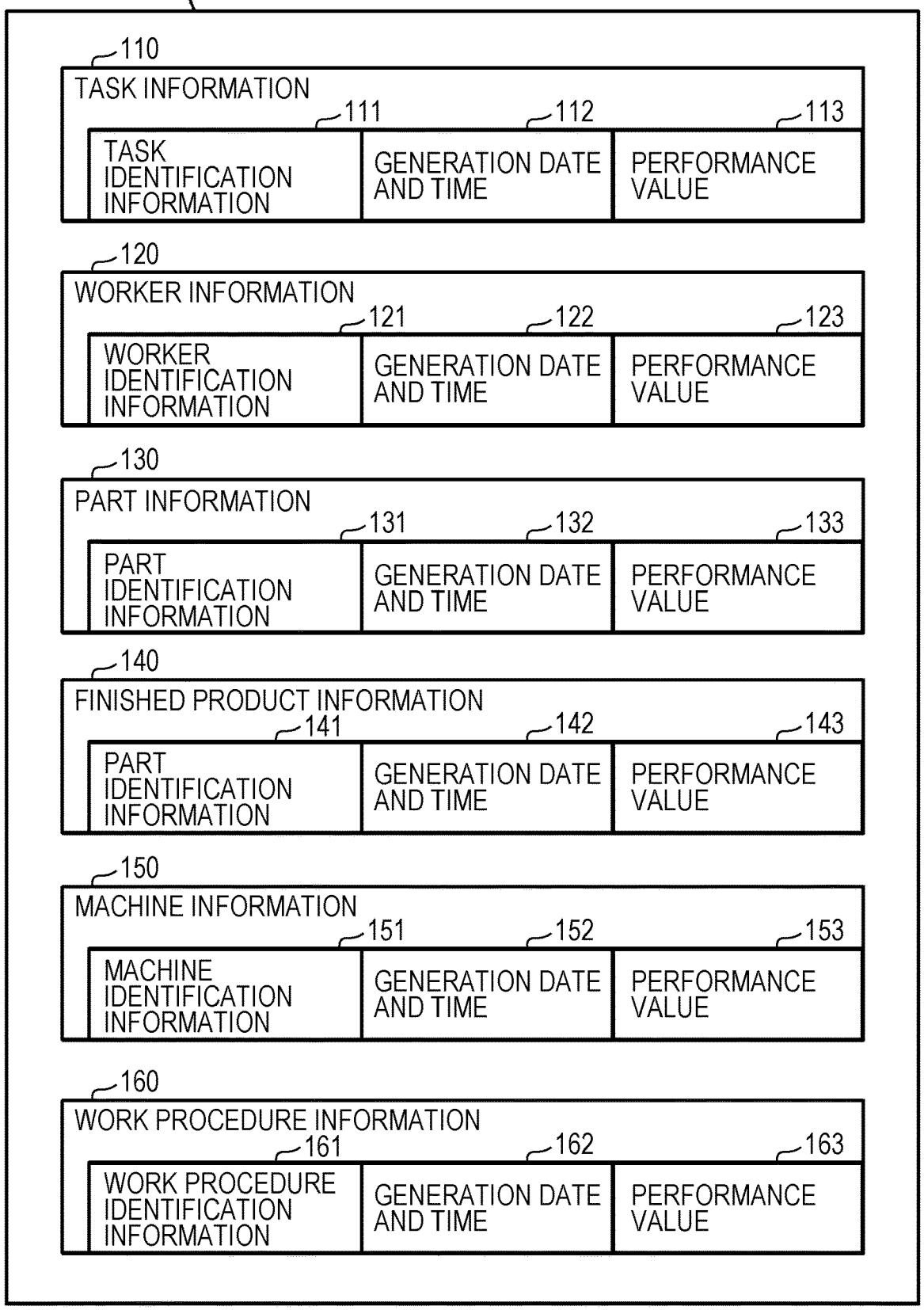
FIG. 7 is a diagram illustrating an example of configuration information of site data.

FIG. 7 is a diagram illustrating an example of a configuration of the site data 100.

As shown in FIG. 7, the site data 100 is configured to include task information 110, worker information 120, part information 130, finished product information 140, machine information 150, and work procedure information 160.

The task information 110 is configured to include task identification information 111, generation date and time information 112, and performance value information 113. The task identification information 111 is an identifier for defining what type of task a task in which the site data 100 has been generated is. The generation date and time information 112 is information of a date and time when the site data 100 has been generated. For example, a date and time when the site data is collected or generated by the data generation device 5 is recorded in the generation date and time information 112. The performance value information 113 is performance value information attached by the data generation device 5. For example, in the case where the task is pressing, the number of finished products produced by one pressing work or the number of non-defective products sent to the post-process is recorded as the performance value information.

The worker information 120 is configured to include worker identification information 121, generation date and time information 122, and performance value information 123. The worker identification information 121 is an identifier for specifying a worker responsible for a work who has performed the work. For example, an ID card held by the worker is read before the work, so that the worker identification information 121 for specifying the worker responsible for the work can be acquired. The generation date and time information 122 is information of a date and time when the worker has started the work. For example, when the worker performs a pressing work, a date and time at which one pressing work starts is recorded as date and time information. The performance value information 123 is information of a period during which the worker performed the work. For example, when the worker performs the pressing work, a work period (time) required for one pressing work is recorded as period information.

The part information 130 is configured to include part identification information 131, generation date and time information 132, and performance value information 133. The part identification information 131 is an identifier for specifying a material (part) used in the work. The generation date and time information 132 is information showing a date and time when the part has been produced. The performance value information 133 is information such as the number of parts produced.

The finished product information 140 is configured to include finished product identification information 141, generation date and time information 142, and performance value information 143. The finished product identification information 141 is an identifier for specifying a finished product produced by the work. The generation date and time information 142 is information showing a date and time when the finished product has been produced. The performance value information 143 is information such as the number of finished products produced by the corresponding task.

The machine information 150 is configured to include machine identification information 151, generation date and time information 152, and performance value information 153. The machine identification information 151 is an identifier for specifying a machine used in the work and types such as a pressing machine, a coating machine, and an assembling machine are specified by the machine identification information 151. The generation date and time information 152 is information showing a date and time when the machine has started the work. The performance value information 153 is information such as an operation time of the machine.

The work procedure information 160 is configured to include work procedure identification information 161, generation date and time information 162, and performance value information 163. The work procedure identification information 161 is an identifier for specifying a work procedure manual necessary for the work. The generation date and time information 162 is information showing a date and time when the work procedure manual has been acquired. The performance value information 163 is information showing a time required when the work is performed according to a work procedure.

Next, an example of a connection relation of each information configuring the definition information 300 (definition information 400) after being connected by the connection information 314 (connection information 414) will be described. The connection relation is accumulated in the association data accumulation unit 15.

Figure 8:
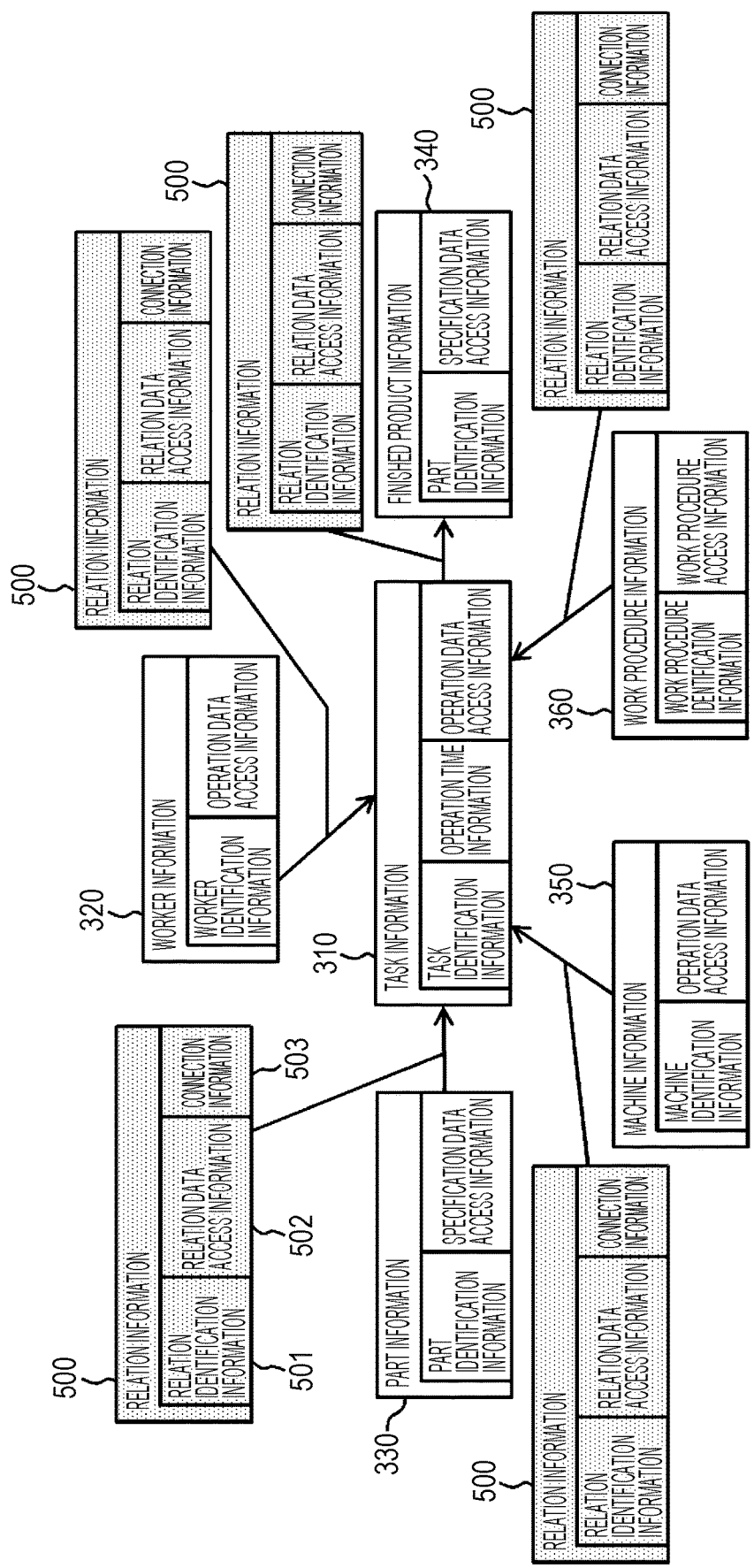
FIG. 8 is a diagram illustrating an example of a connection relation of each information configuring definition information after being connected on the basis of connection information.

FIG. 8 is a diagram illustrating an example of a connection relation of each information configuring the definition information 300 (definition information 400) after being connected by the connection information 314.

As shown in FIG. 8, each information (for example, the task information 310 and the worker information 320 and the task information 310 and the part information 330) configuring the definition information 300 (FIG. 4) or the definition information 400 (FIG. 5) is associated by relation information 500. The relation information 500 is generated by expanding the connection information 314 (414) of the task information 310 (410) of the definition information 300 (400) on the database.

The relation information 500 is configured to include relation identification information 501, relation data access information 502, and connection information 503.

The relation identification information 501 is information for defining a connection relation of each information and is identification information for defining association between the task information 310 and the part information 330 and connection between the task information 310 and the worker information 320, for example. That is, the relation identification information 501 can be said to be an identifier for specifying a connection line between each information.

The relation data access information 502 is information including a memory address to access logic for prescribing a connection relation of each information of the definition information 300 (400) stored in the database different from the association data accumulation unit 15 (the information collection and display system 1). Processing for defining the connection relation of each information is performed by the logic applied by the relation data access information 502. Here, the logic is information such as a flowchart for prescribing processing for connecting predetermined information and other information. That is, the relation data access information 502 can also be said to be information showing the meaning of the connection between each information.

The connection information 503 is information necessary for connection between each information and includes information for defining a start point of predetermined information (for example, the part information 330) and information for defining an end point of other information (for example, the task information 310) associated with the predetermined information. As a result, the start point and the end point of the predetermined information (for example, the part information 330) and other information (for example, the task information 310) can be determined and a direction of the connection line is determined.

All information configuring the definition information 300 (400) are associated by the relation information 500. An example of the association data 200 in which each information of the definition information 300 (400) are specifically associated by the relation information 500 is shown in FIGS. 9 and 10.

In FIGS. 9 and 10, a task 710 of a pre-process and a task 720 of a post-process are associated on the basis of a predetermined task 700 and each information such as a machine and a worker is connected to each of the tasks 700, 710, and 720 with predetermined association, by the relation information 500. In FIGS. 9 and 10, although only a part of the relation information 500 to connect each information is described for the sake of convenience of explanation, the relation information 500 is set to all connections between each information in actuality.

Here, in the embodiment, the case where a plurality of tasks is connected linearly (in a line shape) and information such as a part and a machine is associated with each task has been described as an example. However, it is considered that the information associated with the predetermined task is associated with a plurality of other tasks and it is considered that each information associated with each of the plurality of tasks is associated with the predetermined task. When a plurality of tasks exists in the manufacturing process, it is considered that each task is not directly connected by the relation information 500 but is associated with other tasks via information associated with each task.

Figure 11:
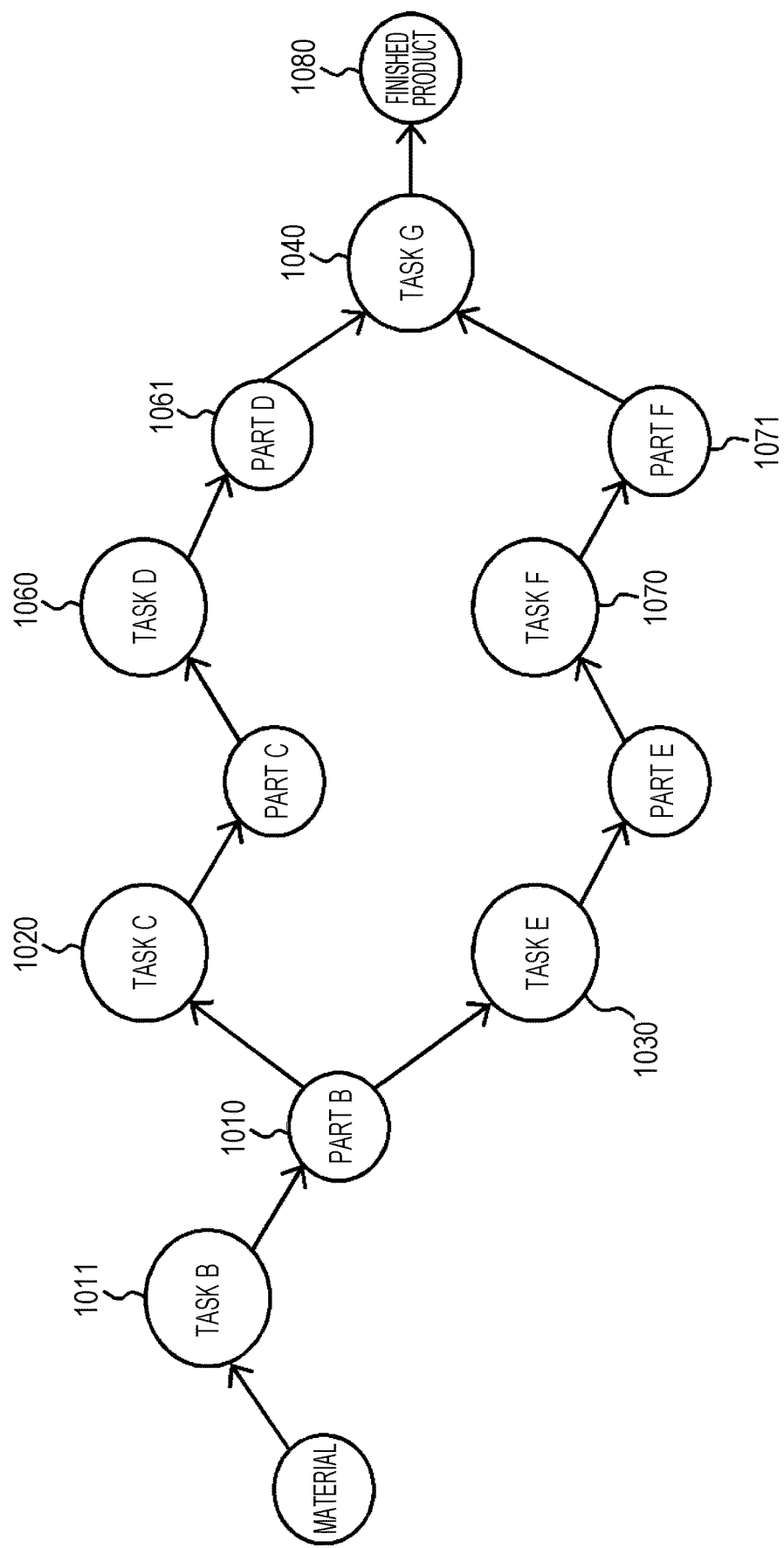
FIG. 11 is a schematic diagram illustrating only a connection relation of each information of association data.

FIG. 11 is a schematic diagram illustrating only a connection relation of each information (node) of the association data 200 and exemplifies the case where a part B node 1010 associated with a predetermined task B node 1011 is used as inputs of a plurality of other task nodes (a task C node 1020 and a task E node 1030) and a part D node 1061 generated by a task D node 1060 and a part F node 1071 generated by a task F node 1070 are used as an input of a task G node.

As shown in FIG. 11, a plurality of parts B (nodes 1010) are produced by executing a task B (node 1011) corresponding to the pre-process and the plurality of parts B (nodes 1010) are used as materials of a task C (node 1020) and a task E (node 1030) corresponding to a post-process. In the task G (node 1040), it is seen that a part D (node 1061) produced by a task D (node 1060) and a part F (node 1071) produced by a task F (node 1070) are used as materials and a finished product 1080 is produced. In this case, in the operation data access information 313 configuring the task information 310 shown in FIG. 4, the plurality of parts B may be lot-managed in actual operation information (that is, one identifier is assigned to the plurality of parts B) and one part B may be managed as a single product (that is, one identifier is assigned to one part B). For example, when the parts B are lot-managed, the parts B are used in a lot unit in the task D and the task E and when each part B is managed as a single product, the part B is used in a single product unit in the task D and the task E.

The connection relation of each information configuring the association data 200 is not limited to the case exemplified in FIG. 11. For example, as shown in FIG. 12, a plurality of pieces of information nodes may be associated with one task node.

Figure 12:
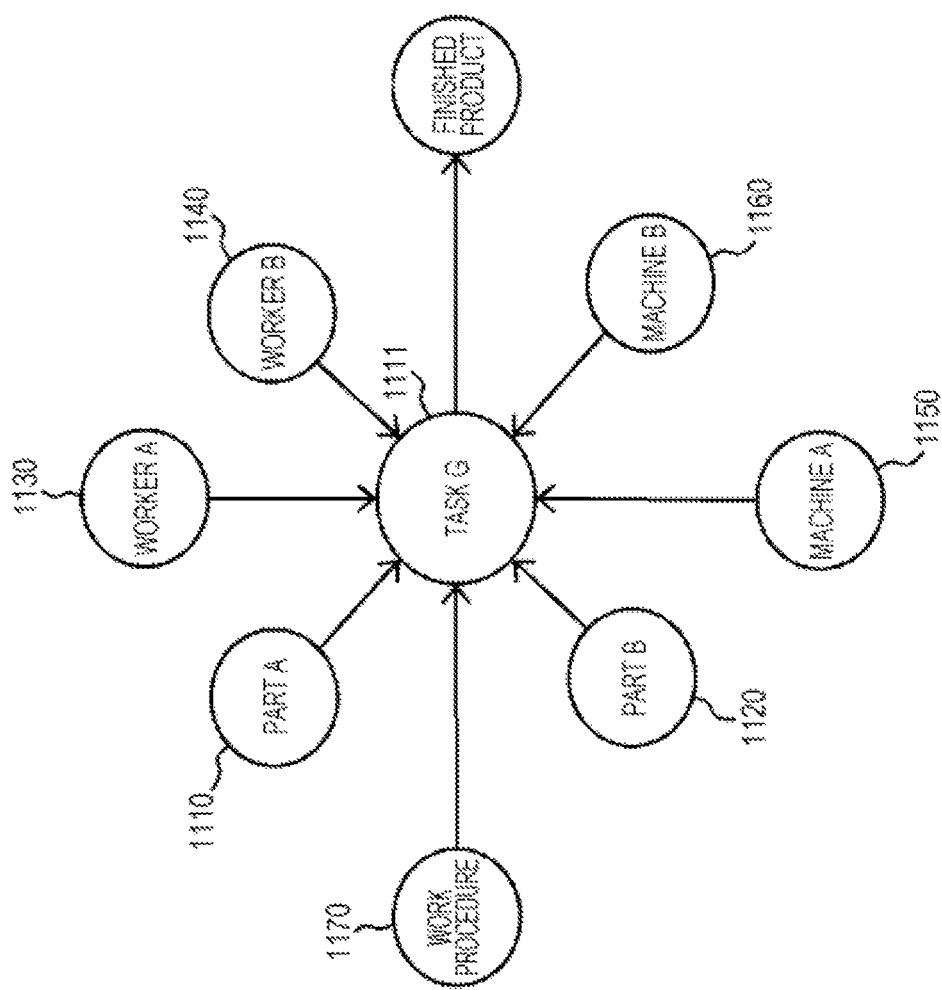
FIG. 12 is a diagram illustrating only a connection relation of each information configuring association data according to another embodiment.

In the embodiment, as shown in FIG. 12, a part A node 1110 and a part B node 1120 to be two part nodes, a worker A node 1130 and a worker B node 1140 to be two worker nodes, and a machine A node 1150 and a machine B node 1160 to be two machine nodes, defined as 4M nodes, are associated with one task G node 1111. That is, in the predetermined task G node 1111, a plurality of workers A and B may process a plurality of parts A and B using a plurality of machines A and B. Here, because a work procedure node 1170 defines task content (work procedure) of the task G node 1111, one work procedure node 1170 is associated with the work G node 1111.

Figure 13:
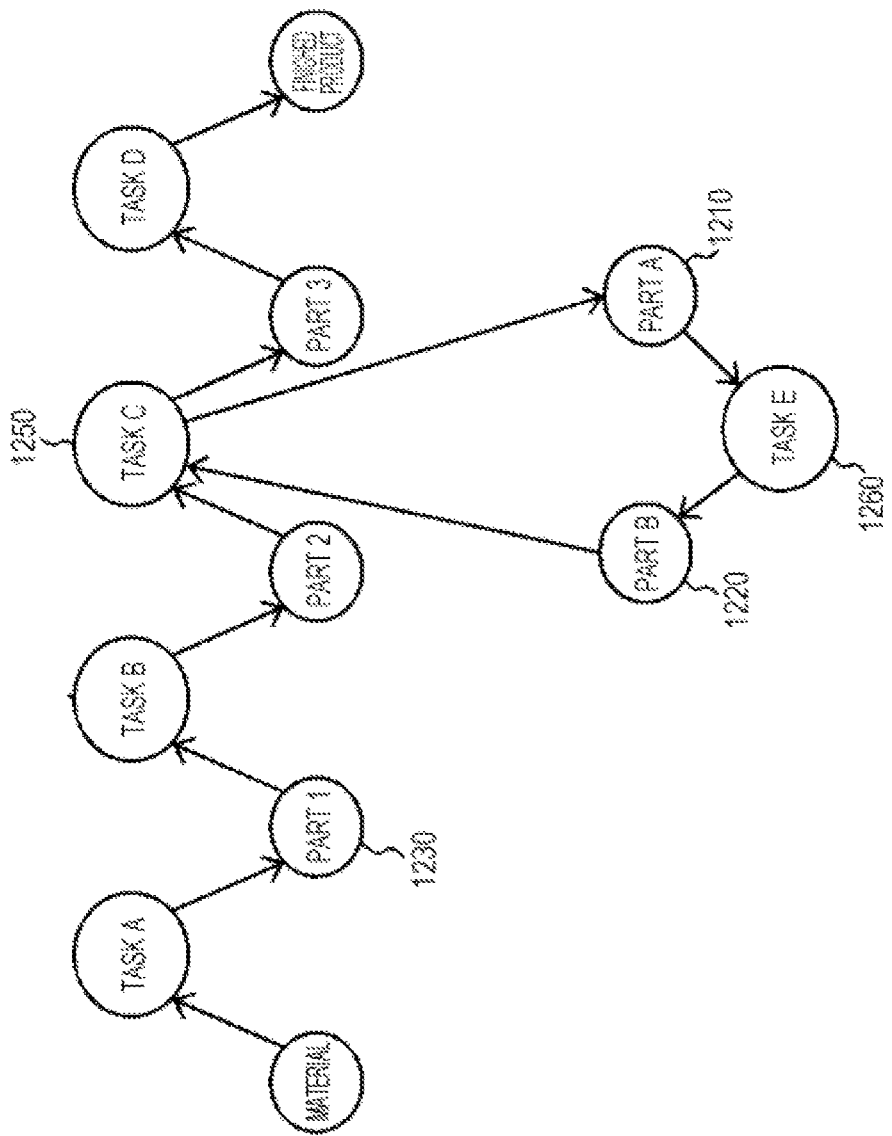
FIG. 13 is a diagram illustrating an example of a model data creation screen displayed by an association data model creation unit.

In addition, as shown in FIG. 13, a connection relation in which a part produced by a predetermined task is returned to the predetermined task again via other task and the part is used may be used In the embodiment, a part A (node 1210) produced by a task C (node 1250) to be a post-process is input as a material of a task E (node 1260) and a part B (node 1220) is output as a finished product. The part B (node 1220) is input again as a material of the task C (node 1250). This shows a flow in which, in the course of producing a finished product via a manufacturing line configured by the task A, the task B, the task C, and the task D having the same identification information, the task C (node 1250) is output once as the part A (node 1210) and as a result of processing in the task E (node 1260), the part A changes to a part equivalent to a part 1 (node 1230) and the work C is executed again. For example, this shows a flow of processing in which the task C is a task such as inspection, there is a quality problem as a result of the inspection, the task C is out of a line once, modification is performed by the task E, and the processing is executed again from the task C. The task node in the drawing shows a manufacturing process having identification information showing a specific finished product and when the same identification information passes through the same task, it is assumed to be an input of a task node created so far, in this case, the task C (node 1250). Because the parts having the same identification information are input to the task C (node 1250) a plurality of times, the parts input the plurality of times are stored as operation data or the parts input the plurality of times are stored in the extension information 470 (see FIG. 5).

[Model Data Creation Screen]

Next, an example of a model data creation screen 600 by the association data model creation unit 10 will be described using FIG. 14. The model data creation screen 600 is displayed on a display to be an example of the user interface 7 connected to the association data model creation unit 10. The user creates model data of the manufacturing process while viewing the model data creation screen 600.

Figure 14:
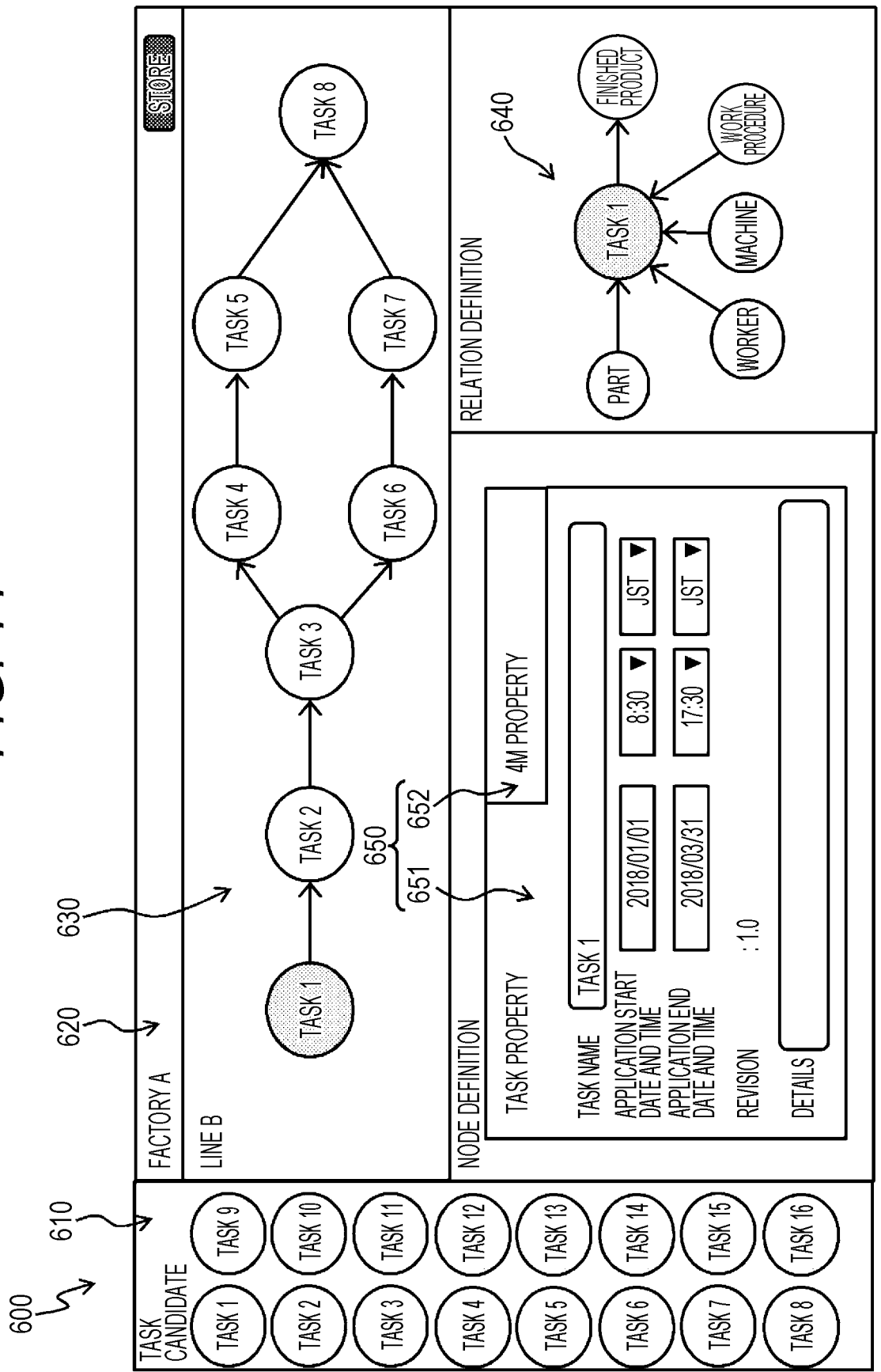
FIG. 14 is a diagram showing a state in which display is switched from a task property screen to a 4M property screen, on a node definition information sub-screen.

As shown in FIG. 14, the model data creation screen 600 is configured to include a task candidate sub-screen 610 to display a list of task candidates, a location sub-screen 620 to show what manufacturing factory the manufacturing process is performed in, a line sub-screen 630 to show entire information of a production line (task) in the manufacturing factory, a data model display sub-screen 640 to define association with a predetermined manufacturing line (task), and a node definition information sub-screen 650 to define a property value of a node of the predetermined manufacturing line (task) displayed on the data model display sub-screen 640.

Task nodes (a task 1 node to a task 16 node) registered in the task candidate sub-screen 610 are previously registered as system information and are previously set according to task content of the user. The line sub-screen 630 can define a process sequence of each task in the manufacturing process by sequentially connecting each task node using the task 1 node to the task 16 node displayed on the task candidate sub-screen 610. The 4M nodes are associated with each of the task 1 node to the task 16 node and details of the 4M nodes or details of the task nodes are input using the data model display sub-screen 640 and the node definition information sub-screen 650. In the node definition information sub-screen 650, a task property screen 651 to set properties of the task nodes and a 4M property screen 652 to set properties of the 4M nodes are selectively switched.

In the embodiment, because the task 1 node is selected in the line sub-screen 630 (see a colored portion shown in FIG. 14), each information such as parts and workers is associated with the task 1 node as a center, in the data model display sub-screen 640. Because the task 1 node is selected in the data model display sub-screen 640 (see a colored portion shown in FIG. 14), a task node name (task 1 node) is registered in the task property screen 651 of the node definition information sub-screen 650 and a period where the selected task 1 node is applied on a system is divided into an application start date and time (for example, Jan. 1, 2018, 8:30 am) and an application end date and time (for example, Mar. 31, 2018, 5:30 pm) and registered in the task property screen 651. Here, when a property value of the task 1 node is changed and a new task 1 node is used, the task node can be updated by matching the application end date and time of the previous task 1 node with an application start date and time of the new task 1 node and revising the task 1 node with the new task 1 node.

Figure 15:
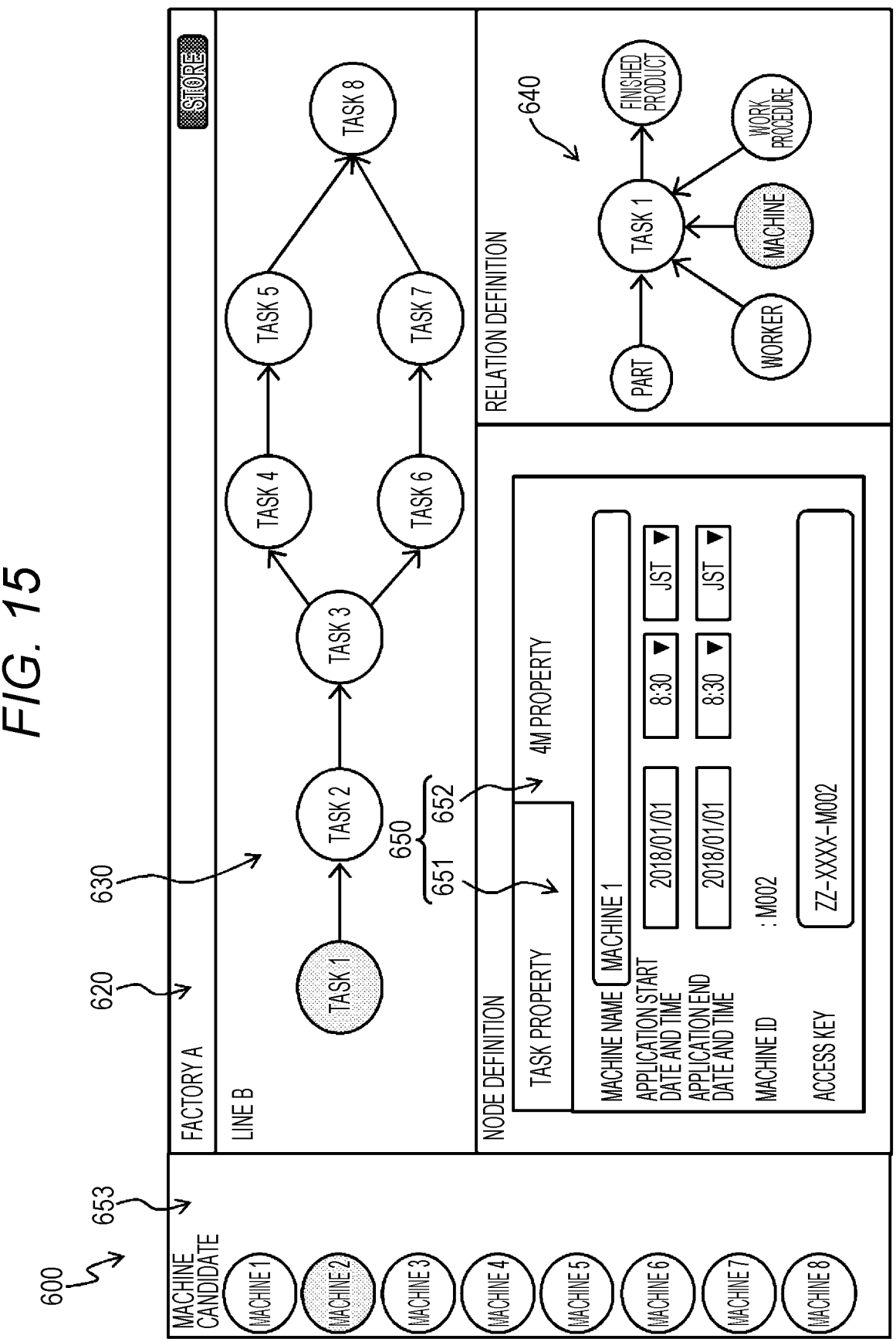
FIG. 15 is a flowchart illustrating a flow of processing until association data is registered in an association data accumulation unit.

Here, if the 4M nodes such as the worker node and the machine node are selected in the data model display sub-screen 640, properties of the selected 4M nodes are displayed on the 4M property screen 652. FIG. 15 is different from FIG. 14 in that a machine candidate sub-screen 653 is displayed in place of the task candidate sub-screen 610, at a position of the task candidate sub-screen 610 of FIG. 14. A list of machine nodes registered in advance is displayed on the machine candidate sub-screen 653 and one machine node selected from the list of machine nodes can be allocated to the machine node of the node definition information sub-screen 650. In the embodiment, a machine 2 node is selected from the list of machine nodes (see a colored portion shown in FIG. 15) and is allocated to the machine node of the node definition information sub-screen 650.

Furthermore, in the node definition sub-screen 650, a property value of the selected machine 2 node can be set and a machine node name (for example, the machine 2 node), an application start date and time (for example, Jan. 1, 2018, 8:30 am), an application end date and time (for example, Mar. 31, 2018, 17:30 pm), a machine ID (for example, M002), and an access key (for example, ZZ-XXXX-M002) can be input and set. The access key is an access key to access a database in which operation information of the 4M node (for example, the machine node) is stored. The association data registration unit 11 can acquire the operation information of the predetermined 4M node from the database, on the basis of the access key.

[Association Data Registration Processing]

Next, a flow of processing until the association data 200 is registered in the association data accumulation unit 15 will be described.

Figure 16:
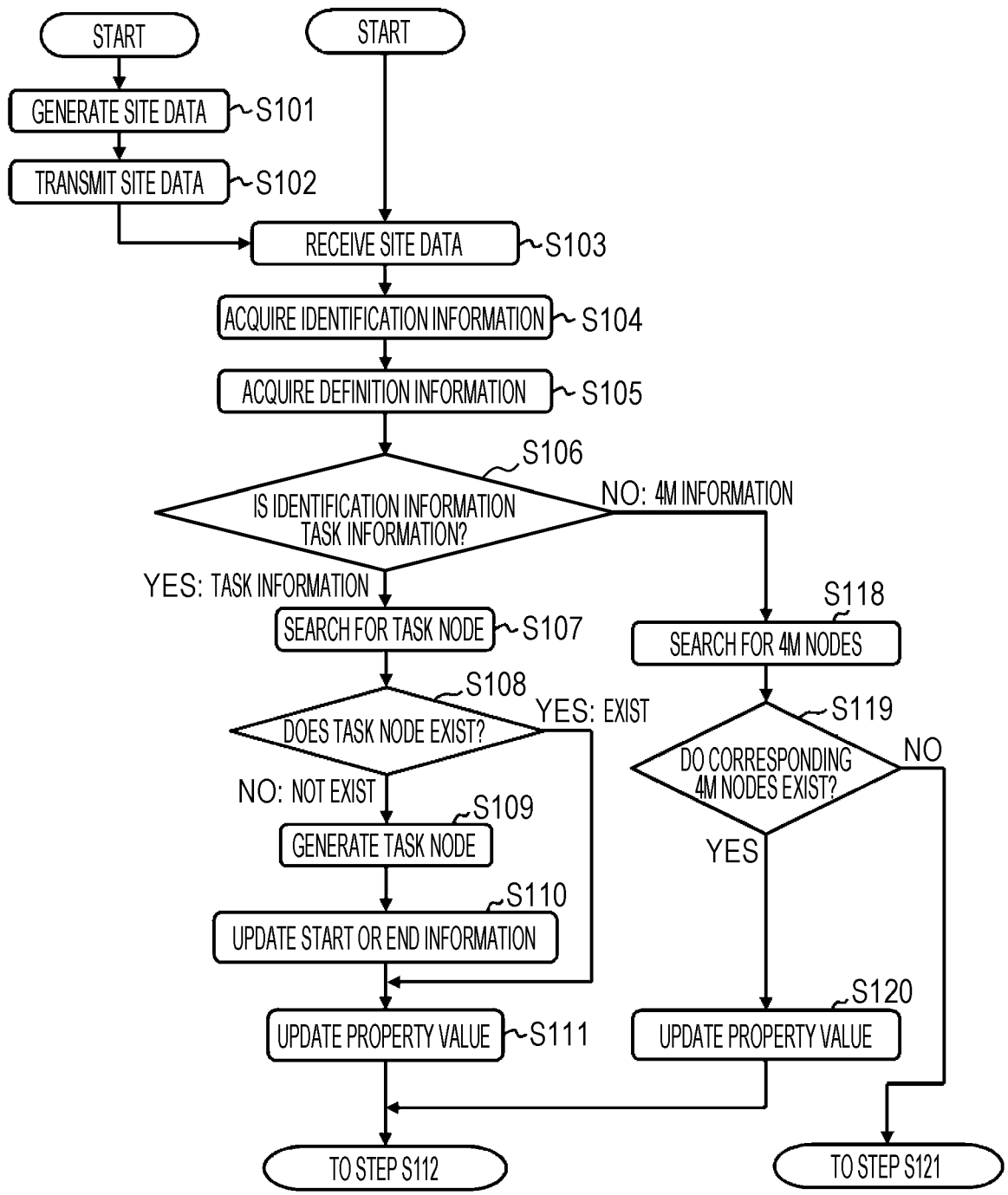
FIG. 16 is a flowchart illustrating a flow of processing until association data is registered in an association data accumulation unit.
Figure 17:
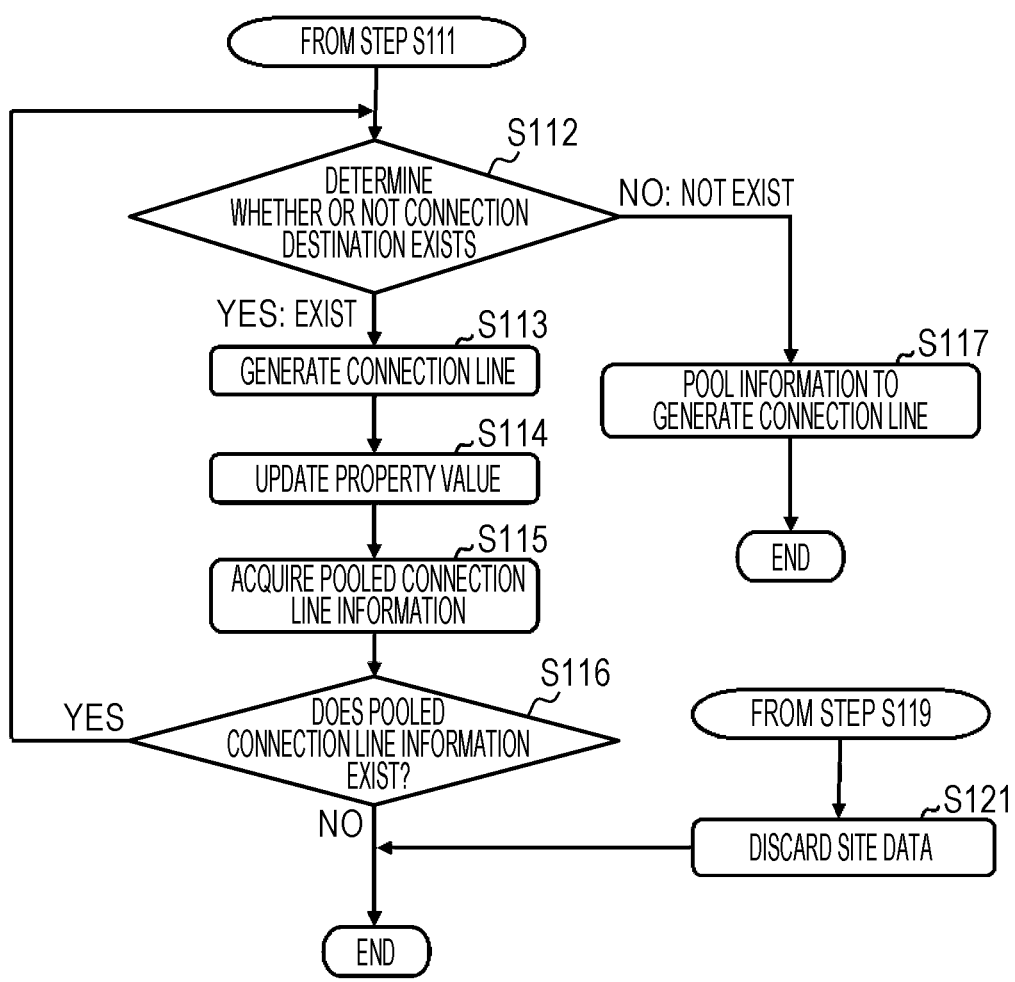
FIG. 17 is a flowchart of generation processing of 4M information by an association data registration unit.

FIGS. 16 and 17 are flowcharts illustrating the flow of the processing until the association data 200 is registered in the association data accumulation unit 15.

First, in each manufacturing process (task), the data generation device 5 collects or generates the site data 100 (step S101) and then transmits the site data 100 to the information collection and display system 1 via the network 2 (step S102).

In the information collection and display system 1, if the site data 100 is received (step S103), identification information (identification information 111, 121, 131, 141, 151, and 161 shown in FIG. 7) included in the site data 100 received by the association data registration unit 11 is acquired (step S104) and the definition information 300 (or 400) corresponding to each of the acquired identification information is acquired from the association data model creation unit 10 (step S105). In addition, the association data registration unit 11 determines whether the definition information 300 (or 400) acquired from the association data model creation unit 10 is the task information 310 (410) or the 4M information such as the worker information 320 (420), the part information 330 (430), the machine information 350 (450), and the work procedure information 360 (460) other than the task information 310 (410) (step S106).

When it is determined that the acquired definition information 300 (400) is the task information 310 (410) (step S106: Yes), the association data registration unit 11 searches for the task node corresponding to the task information 310 (410) from the association data accumulation unit 15 (step S107). When the task node corresponding to the task information 310 (410) cannot be searched (step S108: No), the association data registration unit 11 generates a corresponding task node, on the basis of the acquired identification information and definition information 300 (or 400) (step S109). When the task node corresponding to the task information 310 (410) is searched (step S108: Yes), the association data registration unit 11 proceeds to step S111.

The association data registration unit 11 acquires generation date and time information (for example, 112, 122, 132, 142, 152, and 162) included in the site data 100 for the generated task node and registers the generation date and time information as start information of the generated task node in the association data accumulation unit 15 (step S110). Then, the association data registration unit 11 updates a property value of the task node, for example, data in the extension information 510 (step S111).

Then, as shown in FIG. 17, the association data registration unit 11 constructs connection lines between the respective nodes. Specifically, the association data registration unit 11 determines whether or not an associated node (connection destination) exists on the basis of the definition information 300 (400) acquired from the association data model creation unit 10 (step S112). When it is determined that the association node exists (step S112: Yes), the association data registration unit 11 constructs the connection line on the basis of the definition information 300 (400) (step S113) and updates a property value of the connection line (step S114). Here, the property value of the connection line refers to information added to the connection line, such as the relation identification information 501, the relation data access information 502, and the connection information 503 of the relation information 500 shown in FIG. 8.

After the connection line from the task node is constructed, the association data registration unit 11 acquires information (connection line information) for generating the connection line, stored in the temporary accumulation unit 18, and constructs the connection line (step S115). When the connection line information is not accumulated (step S116: No), this processing ends. When the connection line information is accumulated in the temporary accumulation unit 18 (step S116: Yes), the association data registration unit 11 returns to step S112 and performs generation of the connection line and updating of the property until it is determined that the connection line information is not accumulated in the temporary accumulation unit 18. When it is determined in step S112 that the connection destination does not exist (step S112: No), the association data registration unit 11 accumulates the connection line information in the temporary accumulation unit 18 (step S117) and ends this processing.

Returning to FIG. 16, when it is determined in step S106 that the identification information acquired from the site data 100 is the 4M information different from the task information (step S106: No), the association data registration unit 11 searches for the 4M information corresponding to the identification information from the association data accumulation unit 15 (step S118). When it is determined that the 4M information corresponding to the identification information is accumulated in the association data accumulation unit 15 (step S119: Yes), the 4M information is completely registered as existing information at the time of constructing the manufacturing process. Therefore, the association data registration unit 11 updates the property value (step S120) and proceeds to step S112. When it is determined that the 4M information does not exist (step S119: No), the association data registration unit 11 discards the site data 100 received from the data generation device 5 (step S121) and ends this processing.

[Generation and Registration Processing of 4M Information]

Next, generation and registration processing of the 4M information by the association data registration unit 11 will be described. The worker information, the machine information, and the work procedure information in the 4M information are previously defined at the user side at the time of introducing the manufacturing process and are not generated whenever the predetermined processing is performed, different from the task information. Although a work shift may be changed in a predetermined task unit in the worker information, the worker is registered in the information collection and display system 1 and the machine to execute the task is also already determined and completely installed, when the task starts. Therefore, for the information, the site data is previously registered before the information collection and display system 1 steadily operates.

Figure 18:
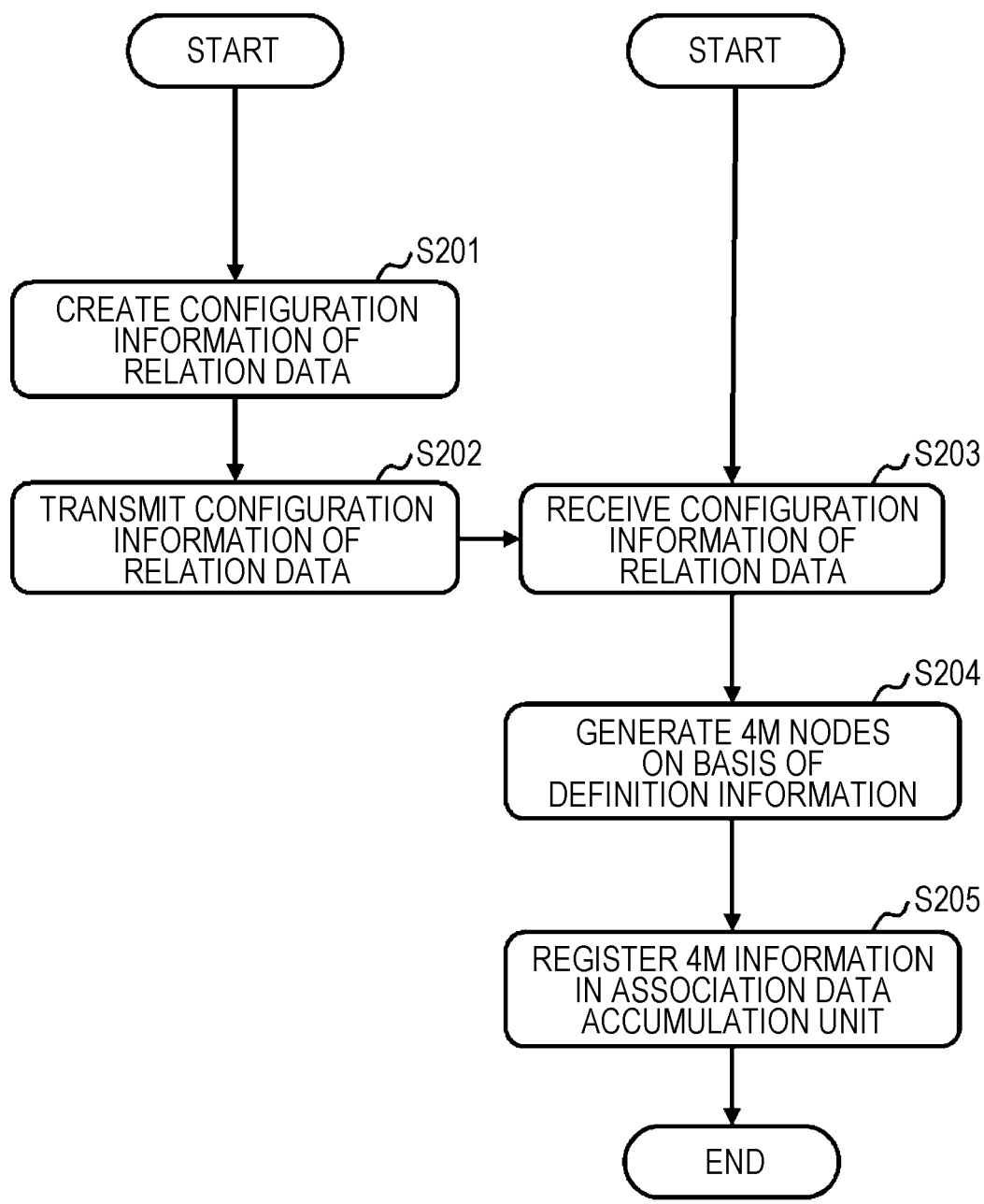
FIG. 18 is a flowchart of extraction processing of association data in an association data search unit.

FIG. 18 is a flowchart of the generation and registration processing of the 4M information by the association data registration unit 11.

First, the association data model creation unit 10 generates configuration information (definition information 300 or 400) of the association data on the basis of the master data accumulated in the master data accumulation unit 3 (step S201) and transmits the generated configuration information to the association data registration unit 11 (step S202). The association data registration unit 11 receives the configuration information transmitted from the association data model creation unit 10 (step S203), generates 4M information according to the received configuration information (step S204), and registers the generated 4M Information in the association data accumulation unit 15 (step S205). As a result, the association data registration unit 11 can generate the 4M information according to the configuration information received from the association data model creation unit 10 and can register the 4M information in the association data accumulation unit 15.

[Extraction Processing of Association Data]

Next, extraction processing of association data in the association data search unit 12 will be described.

Figure 19:
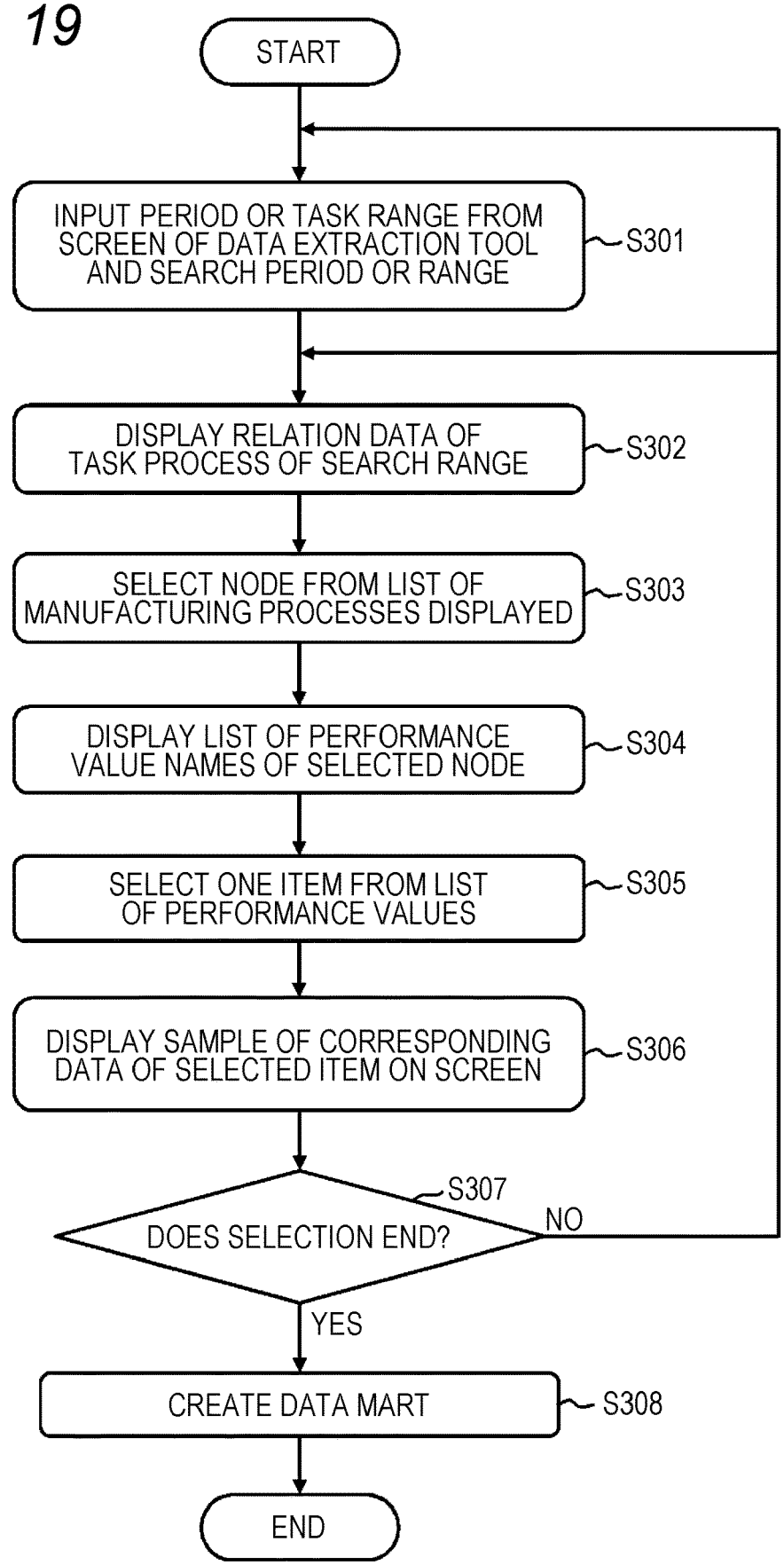
FIG. 19 is a flowchart of processing for accumulating data defined by a user in an association data accumulation unit.

FIG. 19 is a flowchart of extraction processing of the association data 200 in the association data search unit 12. The extraction processing of the association data 200 by the association data search unit 12 is performed using a data extraction tool 800 (see FIG. 23) displayed on the user interface 7 such as a display.

First, using the data extraction tool 800 displayed on the user interface 7, a period, a task range, and the like are input from an entry form 802 to specify an extraction range of the association data 200 (step S301). The association data search unit 12 displays a plurality of task nodes 801 in the manufacturing process to be extracted, from the association data 200 extracted on the basis of the specified range (step S302). The user selects a desired node (for example, a machine 2 node shown in FIG. 23) from the displayed task nodes 801 (step S303) and the association data search unit 12 displays a list of performance value names associated with the node selected by the user (step S304). In the embodiment, a list of performance value names of items 10 to 14 associated with the machine 2 node is displayed by the association data search unit 12, on the basis of the selection of the machine 2 node by the user.

Next, the user selects one item (for example, the item 12 shown in FIG. 23) from the list of performance values (step S305) and displays a sample of the extracted association data on a data display sub-screen (not shown in the drawings) under a screen of the data extraction tool 800 (step S306). The user repeats processing of steps S301 to S306 a plurality of times until the user extracts a list of data items that is required for data analysis and is determined by the user as having a relation (step S307: No). If the selection ends (step S307: Yes) and processing is executed, the association data search unit 12 acquires actual data from the transaction data accumulation unit 4 or the master data accumulation unit 3 on the basis of operational data access information held by each node and creates a data mart in the temporary accumulation unit 18 (step S308).

Figure 20:
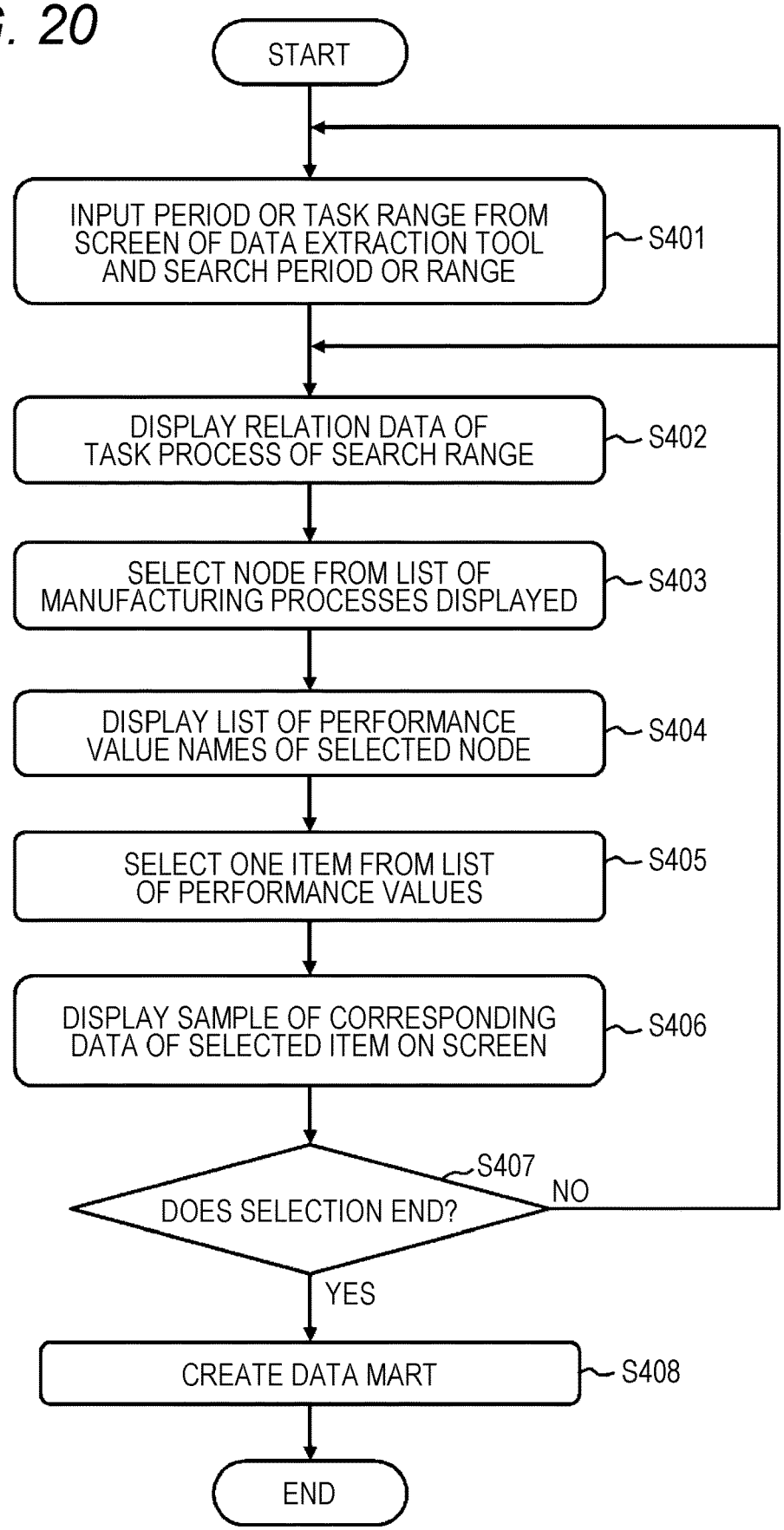
FIG. 20 is a flowchart of data analysis processing.

FIG. 20 is a flowchart of processing for accumulating data defined by the user in the association data accumulation unit 15. The processing (steps S401 to S408 shown in FIG. 20) for extracting the data defined by the user has the same flow as the flowchart described in FIG. 19. A process until association data extracted by ETL (Extract/Transform/Load) is analyzed and an analysis result is displayed is defined. A connection line of association data is constructed between data necessary for the analysis in ETL and an access key to call logic defined by ETL is registered in access information thereof.

[Data Analysis Processing]

Next, data analysis processing performed by a data analysis tool such as the application 8 on the basis of the data mart (analysis data) created by the processing of steps S301 to S308 (or steps S401 to S408) will be described.

Figure 21:
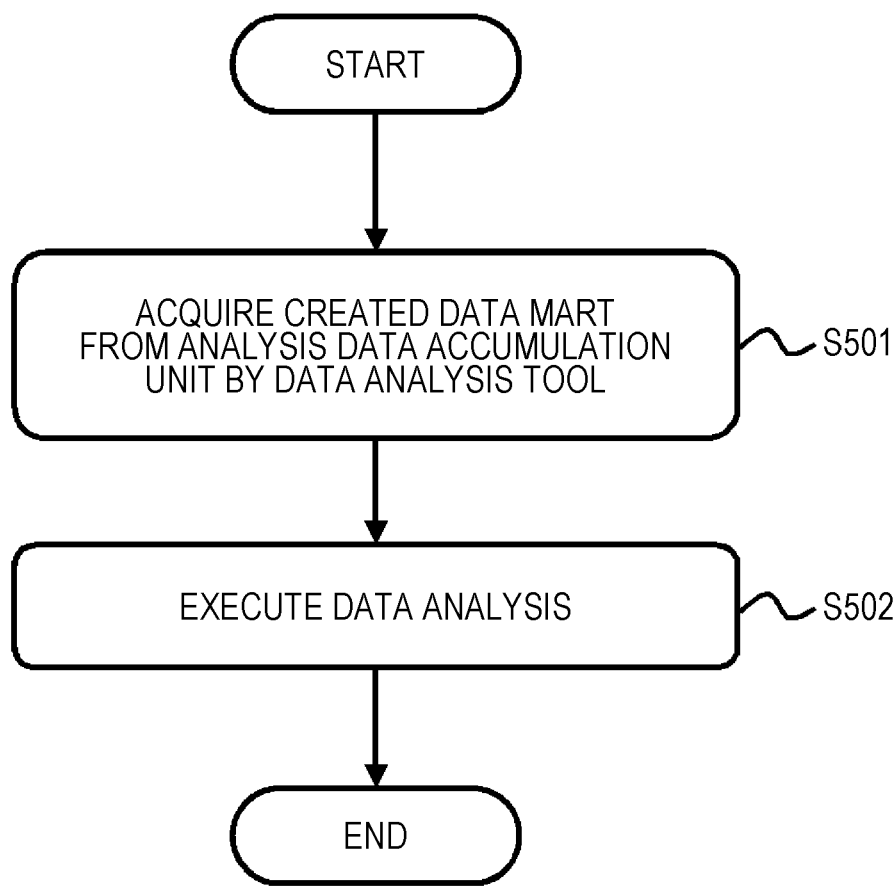
FIG. 21 is a flowchart of data analysis processing performed by a data analysis tool on the basis of a data mart.
Figure 22:
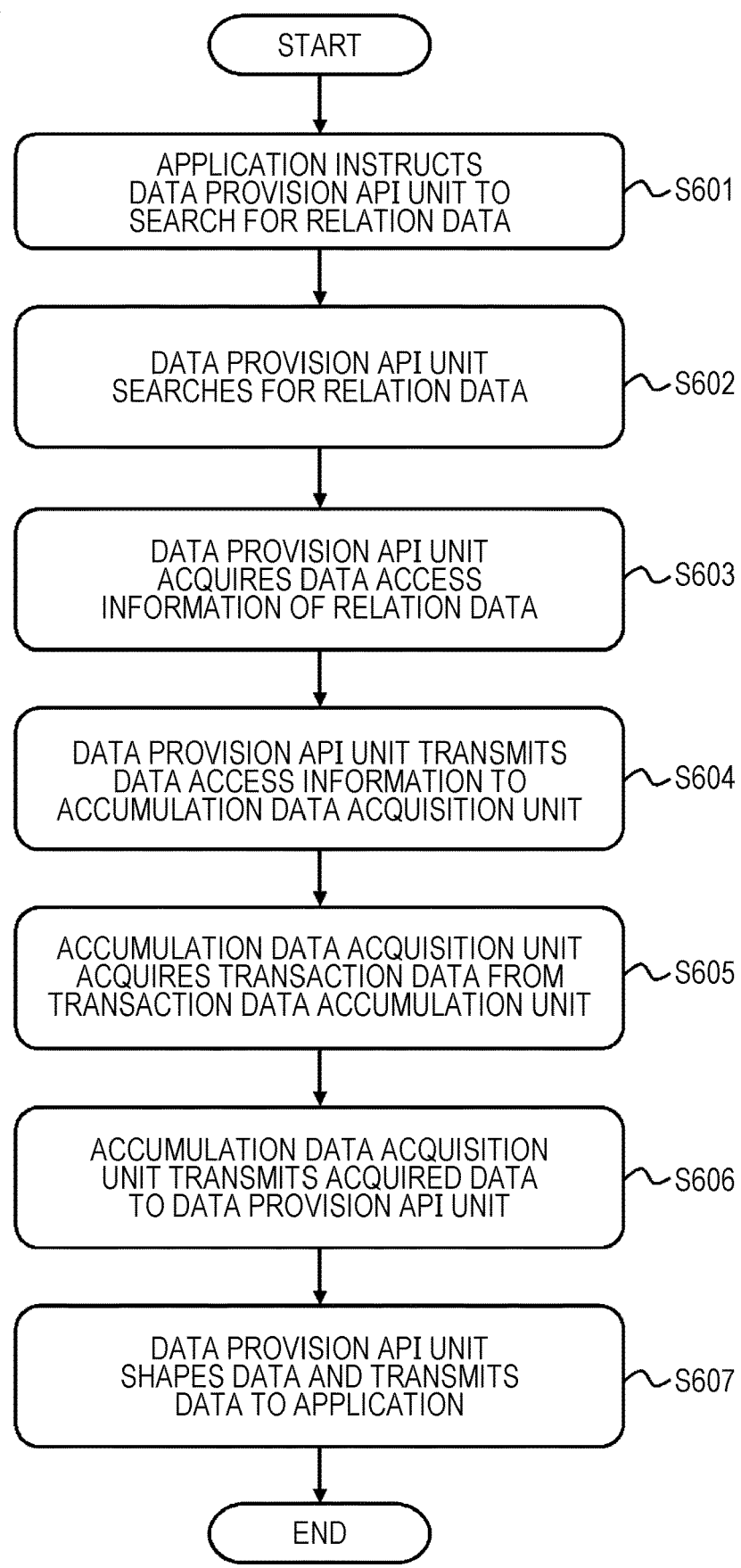
FIG. 22 is a flowchart of generation processing of analysis data by a data provision API unit.

FIG. 21 is a flowchart illustrating the data analysis processing performed by the data analysis tool such as the application 8 on the basis of the data mart (analysis data) created by the processing of steps S301 to S308 (or steps S401 to S408). The data analysis processing is performed by analyzing the analysis data accumulated in the analysis data accumulation unit 14 by the application 8.

The application 8 (data analysis tool) acquires the data mart extracted by the processing of steps S301 to S308 (or steps S401 to S408) described above and accumulated in the analysis data accumulation unit 14 (step S501). The user of the data analysis tool displays the acquired data on the screen using the data analysis tool and performs data analysis (step S502).

[Generation Processing of Analysis Data]

Next, generation processing of analysis data by the data provision API unit 16 will be described.

Figure 23:
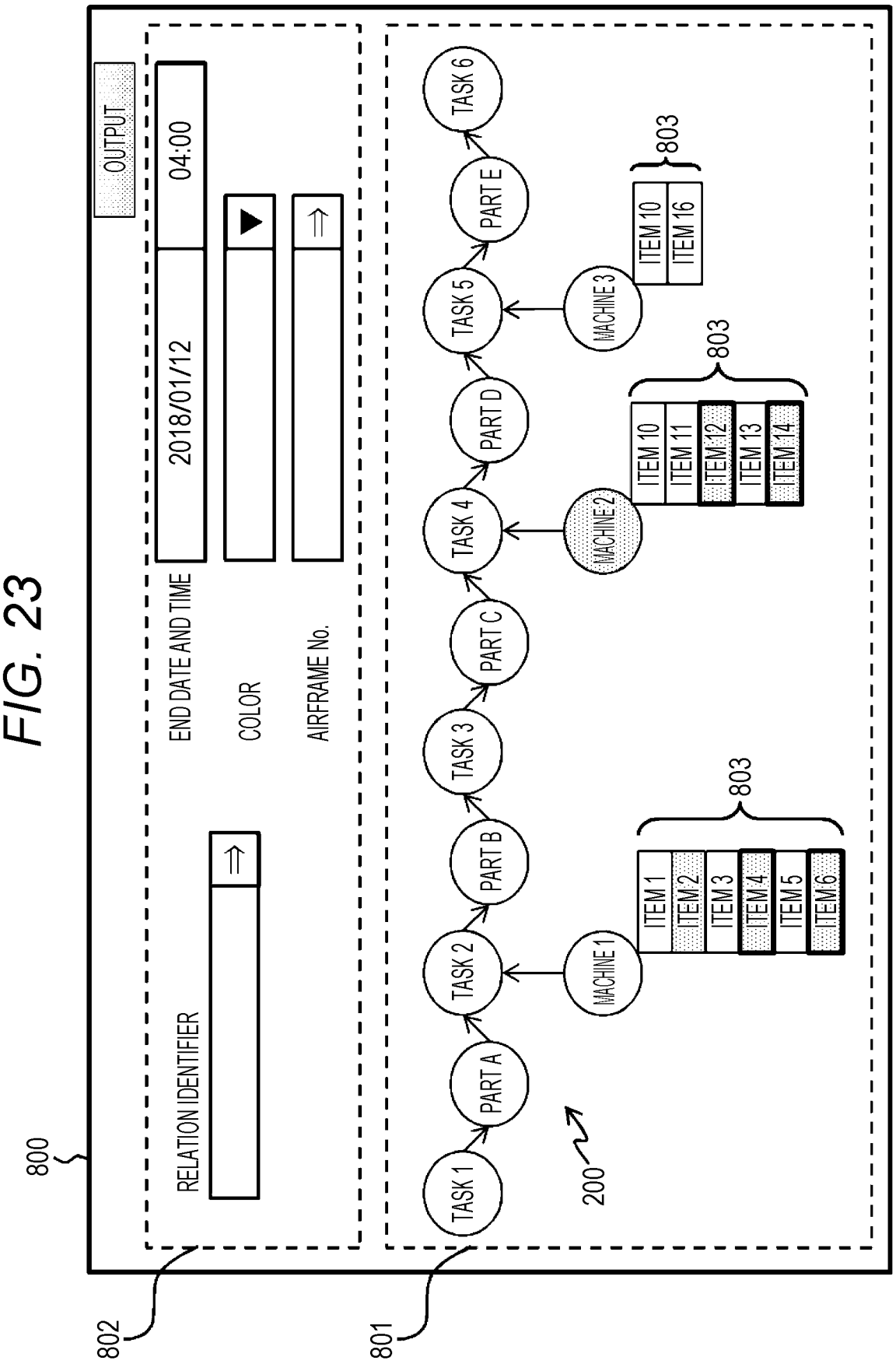
FIG. 23 is a diagram illustrating an example of a data extraction tool displayed on a user interface.

FIG. 23 is a flowchart of generation processing of the analysis data by the data provision API unit 16.

First, the application 8 instructs the data provision API unit 16 to search for the association data 200 necessary for generating the analysis data (step S601). Specifically, the application 8 transmits a search key for searching for the necessary association data 200 to the data provision API unit 16. The data provision API unit 16 searches for the association data 200 from the association data accumulation unit 15, using the search key acquired from the application 8 (step S602). The data provision API unit 16 acquires data access information of the acquired association data 200 (step S603) and transmits the information to the accumulation data acquisition unit 13 (step S604). The accumulation data acquisition unit 13 acquires transaction data to be acquired, from the transaction data accumulation unit 4, on the basis of the received data access information (step S605). The accumulation data acquisition unit 13 transmits the acquired data to the data provision API unit 16 (step S606). The data provision API unit 16 shapes the acquired data and transmits the data to the application 8.

[Data Extraction Tool]

Next, the data extraction tool 800 displayed on the user interface 7 such as the display will be described. The user can simply perform extraction of the association data 200 by visual recognition, using the data extraction tool 800 displayed on the user interface 7.

FIG. 23 is a diagram illustrating an example of the data extraction tool 800 displayed on the user interface 7 such as the display. In FIG. 23, nodes and connection lines of the association data registered in the association data accumulation unit 15 are represented by circles and lines.

The entry form 802 is provided in an upper portion of the screen of the data extraction tool 800 and a search range of the association data 200 necessary for the entry form 802 is input. In a lower portion of the screen of the data extraction tool 800, a plurality of task nodes 801 corresponding to the input search range are displayed. In the task nodes 801, data items 803 registered in the nodes can be displayed in the association data 200 constructed by the circles and the lines. If the data item 803 is a machine node, a performance value name of the machine node is displayed and the performance value name is acquired from the master data accumulation unit 3. The performance value name acquired from the master data accumulation unit 3 is converted into a name easily recognized by the user from a name managed by a machine compared with the machine node by the dictionary database 6. Portion hatched in the data items are data specified by the user and data associated with the specified data and hatching display is performed by the processing of FIG. 19.

For example, using the data extraction tool 800, a period, a task range, and the like are input from the entry form 802 to specify an extraction range of the association data 200 (step S301 of FIG. 19). The association data search unit 12 displays the plurality of task nodes 801 in the manufacturing process to be extracted, from the association data 200 extracted on the basis of the specified range (step S302 of FIG. 19).

The user selects a desired node (for example, a machine 2 node) from the displayed task nodes 801 (step S303 of FIG. 19) and the association data search unit 12 displays a list of performance value names (data item 803) associated with the node selected by the user (step S304 of FIG. 19). In the embodiment, a list of performance value names of items 10 to 14 associated with the machine 2 node is displayed by the association data search unit 12, on the basis of the selection of the machine 2 node by the user.

Next, when the user selects one item (for example, the item 12) from the list of performance values (step S305 of FIG. 19), the association data search unit 12 can search for the item 4 of another task 1 associated with the item 12 selected by the user, display the item 4 by hatching, and extract the item 4 associated with the item 12. Similarly, the user selects the item 14 of the machine 2 node, so that the item 6 of another task 1 associated with the item 14 is searched and is displayed by hatching. As a result, because a search result of an item (second information) of another task associated with a selection item (first information) of a predetermined task can be visually recognized easily, it becomes easy to perform the following association analysis.

As described above, in the embodiment, there is the information collection and display system 1 in which the data generation device 5 that generates the site data 100 and the transaction data accumulation unit 4 that stores the site data 100 generated by the data generation device 5 are connected. The information collection and display system 1 includes the association data accumulation unit 15 that stores the association data 200 defining the association of each of the plurality of pieces of information included in the site data 100; the association data search unit 12 that searches for another 4M information (second information) associated with the predetermined 4M information (first information) included in the plurality of pieces of information, on the basis of the association data 200 stored in the association data accumulation unit 15; and the user interface 7 that displays the connection relation of the plurality of pieces of information associated by the association data 200. The association data search unit 12 searches for the second information associated with the first information on the basis of the association data 200, according to selection of the first information in the connection relation of the plurality of pieces of information displayed on the user interface 7, and displays the first information and the second information on the user interface 7 with the connection relation of the plurality of pieces of information.

By this configuration, in the information collection and display system 1, the association data 200 may be generated and managed as the definition information defining the connection relation of the site data 100, it is not necessary to hold data in which all the site data 100 are associated, and the capacity of the storage device that stores the association data 200 can be decreased. In addition, in the information collection and display system 1, the first information of the predetermined task is selected from the user interface 7, so that that the second information associated with the first information is searched, and the first information and the second information are displayed on the user interface 7 with the connection relation of the site data 100, so that it is easy to analyze the association by visual recognition.

Although the examples of the embodiments of the present invention have been described, in the present invention, all of the embodiments may be combined and any two or more embodiments may be combined.

In addition, the present invention is not limited to including all of the configurations of the embodiment and a part of the configurations of the embodiment may be replaced by the configurations of another embodiment or the configurations of the embodiment may be replaced by the configurations of another embodiment.

In addition, a part of the configurations of the embodiment may be added, removed, or replaced for the configurations of another embodiment.

Although the present disclosure has been described with reference to example embodiments, those skilled in the art will recognize that various changes and modifications may be made in form and detail without departing from the spirit and scope of the claimed subject matter.

What is claimed is:

1. An information system coupled to a data generation device that generates site data as to plural tasks included in a process, the information system also being coupled to a storage device that stores the site data generated by the data generation device of the information system, the information system being configured to execute:
   generating, for each of the tasks, definition information that defines (a) a plurality of task association information that classify the site data in the storage device, (b) task information that defines task content of itself and association with another task, and (c) extension information being a storage area for storing information with a high utilization rate selectively in advance and which is set in the definition information in advance so that the information with the high utilization rate can be quickly acquired,
   wherein the task association information includes worker information, machine information, material information, and work procedure information, each associated with the task information, and wherein the task information and each of the task association information are associated with each other by relation information created from the definition information;

generating, for each of the tasks, association data that includes a memory address for accessing the site data stored in the storage device on the basis of the definition information;

storing the association data in the information system; and upon receiving selection of a first information derived from a first task of the plural tasks and executed by a first machine node of the plurality of machine nodes, searching the stored association data for a second information derived from a second task of the plural tasks and executed by a second machine node of the plurality of machine nodes, wherein the information system comprises:

a user interface unit that displays a connection relation of the plurality of the task association information associated with each other by the association data, and wherein the information system is further configured to execute:

when the first machine node related to the first task is selected, displaying the first information derived from the first task;

searching, on the basis of the association data, for the second information associated with the first information that is selected from the connection relation displayed;

displaying the first information and the second information on the user interface unit with the connection relation of the plurality of the task association information;

when a first item of the first information is selected from a plurality of displayed items of first information, derived from the first task to be executed by the first machine node, visually indicating that a displayed second item from a plurality of displayed items of the second information, derived from the second task to be executed by the second machine node, is related to the first item of the first information based on the association data;

creating a data mart including the first information and the second information, and performing data analysis utilizing the data mart.

2. The information system according to claim 1,
wherein, in the association data, a part of the task association information in a task is common with a task association information of the next task.

3. The information system according to claim 1, wherein the information system is further configured to execute:

acquiring identification information included in the site data;

specifying the definition information corresponding to the identification information; and generating the association data on the basis of the definition information and the identification information.

4. The information system according to claim 1, further executing:

generating, based on user interaction, the definition information that defines a structure of the task information and the task association information.

5. The information system according to claim 1, wherein the information system is further configured to execute:

acquiring the site data from the storage device, on the basis of the association data; and transmitting the site data acquired to an application outside the information system.

* * * * *